US010638054B2

(12) United States Patent
Komori et al.

(10) Patent No.: US 10,638,054 B2
(45) Date of Patent: Apr. 28, 2020

(54) SYSTEM AND METHOD FOR VISIBLE AND INFRARED HIGH DYNAMIC RANGE SENSING

(71) Applicant: CISTA SYSTEM CORP., Grand Cayman (KY)

(72) Inventors: Hirofumi Komori, San Jose, CA (US); Zhaojian Li, Fremont, CA (US)

(73) Assignee: Cista System Corp., Grand Cayman (KY)

( * ) Notice: Subject to any disclaimer, the term of this patent is extended or adjusted under 35 U.S.C. 154(b) by 437 days.

(21) Appl. No.: 15/415,376

(22) Filed: Jan. 25, 2017

(65) Prior Publication Data
US 2018/0209842 A1 Jul. 26, 2018

(51) Int. Cl.
| | |
|---|---|
| G01J 1/04 | (2006.01) |
| G01J 1/42 | (2006.01) |
| H04N 5/235 | (2006.01) |
| G01J 3/36 | (2006.01) |
| G01J 3/28 | (2006.01) |
| G01J 3/02 | (2006.01) |
| H04N 5/33 | (2006.01) |
| H04N 5/355 | (2011.01) |
| H04N 5/347 | (2011.01) |
| H04N 9/07 | (2006.01) |

(52) U.S. Cl.
CPC .......... *H04N 5/2355* (2013.01); *G01J 3/0208* (2013.01); *G01J 3/2803* (2013.01); *G01J 3/36* (2013.01); *H04N 5/332* (2013.01); *H04N 5/347* (2013.01); *H04N 5/35554* (2013.01); *H04N 9/07* (2013.01); *G01J 2003/2806* (2013.01)

(58) Field of Classification Search
CPC .... H04N 5/2355; H04N 5/235; H04N 5/3355; H04N 5/347; H04N 2209/043; H04N 9/045; H04N 9/04557; H04N 9/04559; H04N 9/0451; H04N 9/04553; H04N 9/04555; H04N 9/0455; G01J 3/0208; G01J 3/2803; G01J 2003/2806; G01J 2003/2809; G01J 3/36; G02B 5/201; G02B 3/0056; G06T 3/4015; H01L 27/146; H01L 27/14645; H01L 27/14649; H01L 27/1465; H01L 27/14627; H01L 27/14621
See application file for complete search history.

(56) References Cited

U.S. PATENT DOCUMENTS

| | | | |
|---|---|---|---|
| 7,242,478 B1 * | 7/2007 | Dombrowski | G01J 3/02 356/419 |
| 9,247,170 B2 * | 1/2016 | Komori | H04N 5/3745 |
| 10,306,191 B2 * | 5/2019 | Komori | G06T 3/4015 |
| 2006/0132660 A1 * | 6/2006 | Kurumisawa | G09G 3/2003 348/631 |
| 2007/0285526 A1 * | 12/2007 | Mann | H04N 5/23245 348/222.1 |

(Continued)

*Primary Examiner* — John R Lee
(74) *Attorney, Agent, or Firm* — Sheppard Mullin Richter & Hampton LLP

(57) ABSTRACT

A high dynamic range sensing device is disclosed. The device includes an array of Bayer pattern units. Each of the Bayer pattern units comprises a plurality of pixels and each of the plurality of pixels comprises a plurality of photodiodes. At least one of the plurality of photodiodes in each pixel is configured to detect near infrared (NIR) light and at least one of the plurality of photodiodes in each of the plurality of pixels is configured to detect visible light.

17 Claims, 18 Drawing Sheets

(top view, four pixels of one Bayer unit)

(side view, one row of the Bayer unit)

(56) References Cited

U.S. PATENT DOCUMENTS

| | | | | |
|---|---|---|---|---|
| 2008/0211945 A1* | 9/2008 | Hong | H04N 5/35563 | 348/294 |
| 2009/0195681 A1* | 8/2009 | Compton | H04N 5/23245 | 348/308 |
| 2009/0278954 A1* | 11/2009 | Kanamori | H04N 9/045 | 348/222.1 |
| 2009/0290039 A1* | 11/2009 | Kanamori | H04N 9/045 | 348/222.1 |
| 2010/0013969 A1* | 1/2010 | Ui | H04N 5/35545 | 348/294 |
| 2010/0097508 A1* | 4/2010 | Yanagita | H01L 27/14603 | 348/301 |
| 2010/0282945 A1* | 11/2010 | Yokogawa | H01L 27/14621 | 250/208.1 |
| 2011/0273597 A1* | 11/2011 | Ishiwata | H01L 27/14603 | 348/272 |
| 2012/0281111 A1* | 11/2012 | Jo | H04N 5/217 | 348/229.1 |
| 2013/0248939 A1* | 9/2013 | Sakai | H01L 27/14806 | 257/231 |
| 2014/0078368 A1* | 3/2014 | Komori | H04N 5/3745 | 348/307 |
| 2014/0125850 A1* | 5/2014 | Kawai | H04N 9/045 | 348/280 |
| 2014/0218567 A1* | 8/2014 | Han | H04N 5/2353 | 348/239 |
| 2014/0232912 A1* | 8/2014 | Morimoto | G03B 11/00 | 348/270 |
| 2015/0163423 A1* | 6/2015 | Yin | H04N 5/3591 | 348/295 |
| 2016/0027837 A1* | 1/2016 | Webster | H01L 27/14621 | 257/432 |
| 2016/0037109 A1* | 2/2016 | Vogelsong | H04N 5/3696 | 348/216.1 |
| 2016/0315112 A1* | 10/2016 | Park | H01L 27/14623 | |
| 2017/0040362 A1* | 2/2017 | Na | H01L 27/14698 | |
| 2017/0099449 A1* | 4/2017 | Kang | H04N 5/3765 | |
| 2017/0237911 A1* | 8/2017 | Won | H01L 27/14623 | 348/164 |
| 2017/0366762 A1* | 12/2017 | Hicks | H04N 5/332 | |
| 2017/0374306 A1* | 12/2017 | Vaartstra | H04N 5/3696 | |
| 2018/0152677 A1* | 5/2018 | Komori | G06T 3/4015 | |
| 2018/0166486 A1* | 6/2018 | Tashiro | H01L 27/14621 | |
| 2018/0176487 A1* | 6/2018 | Price | H04N 5/332 | |
| 2018/0209842 A1* | 7/2018 | Komori | H04N 5/2355 | |
| 2018/0234644 A1* | 8/2018 | Li | G06T 3/4015 | |
| 2018/0278858 A1* | 9/2018 | Seki | H01L 27/146 | |
| 2019/0006406 A1* | 1/2019 | Ozawa | G02B 5/20 | |
| 2019/0208170 A1* | 7/2019 | Komori | G06T 3/4015 | |

* cited by examiner

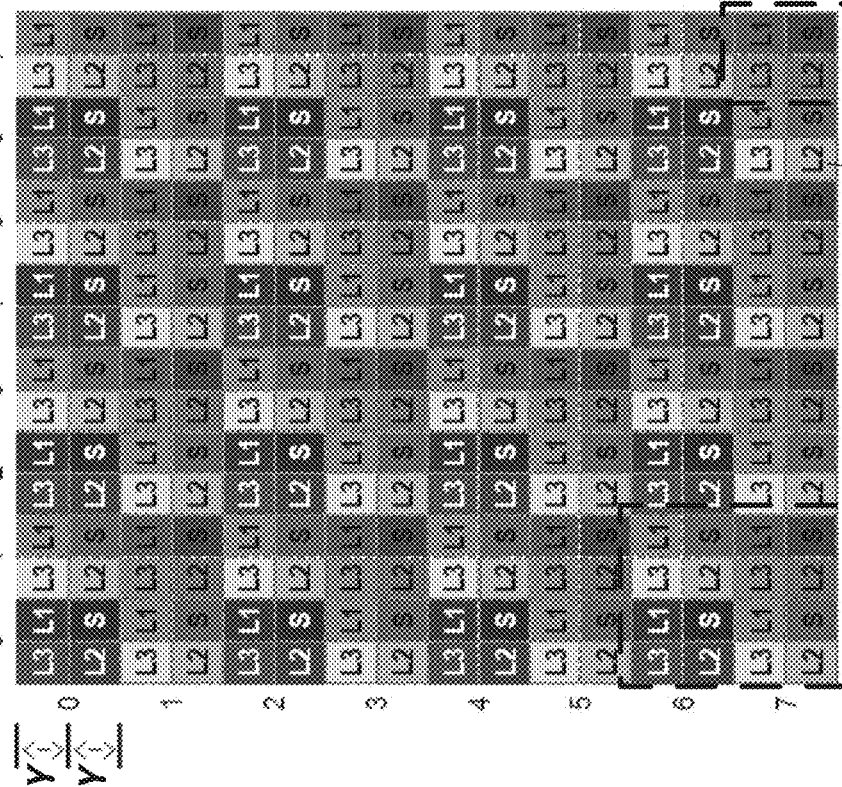
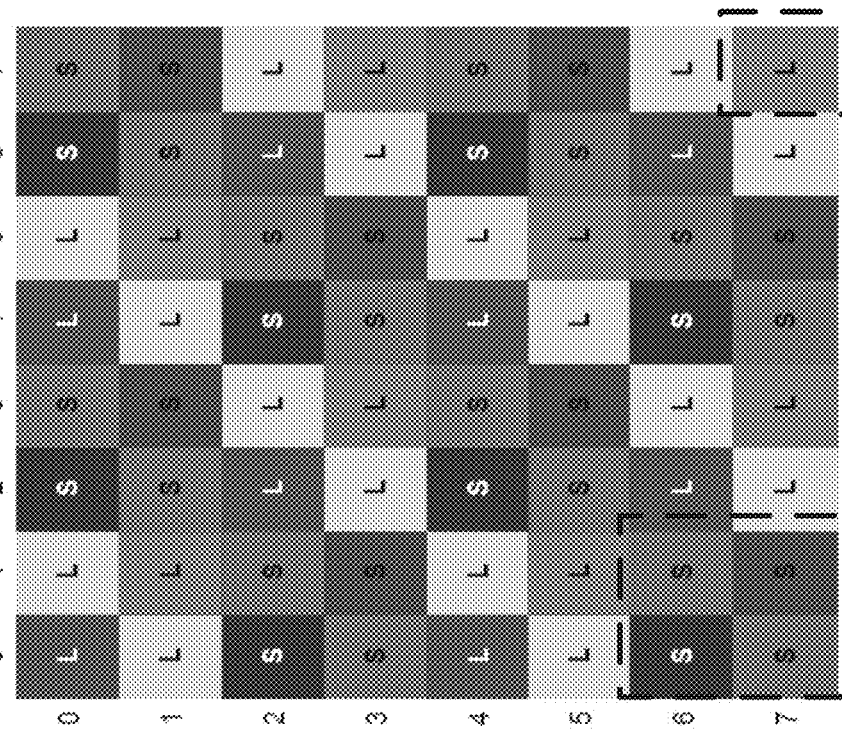
FIG. 2A (prior art)
FIG. 2B (top view) (side view)

(top view) (side view)

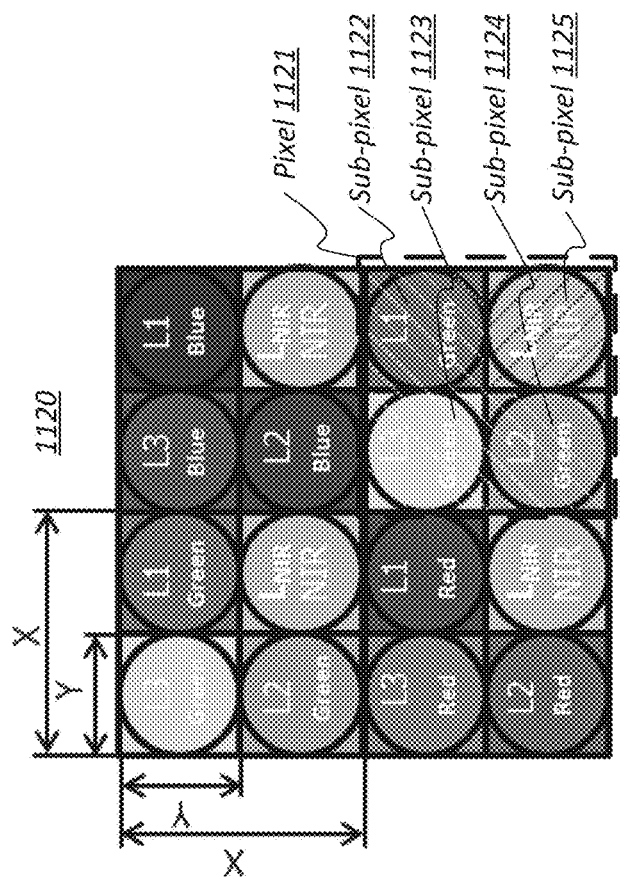
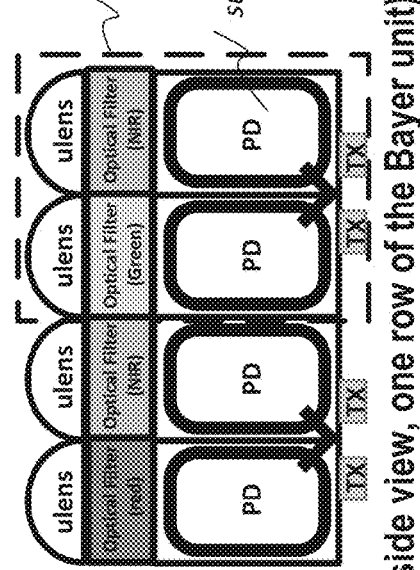
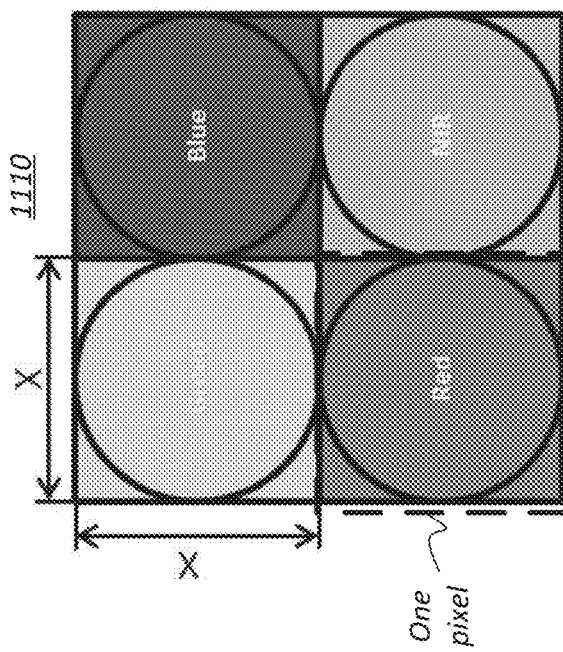
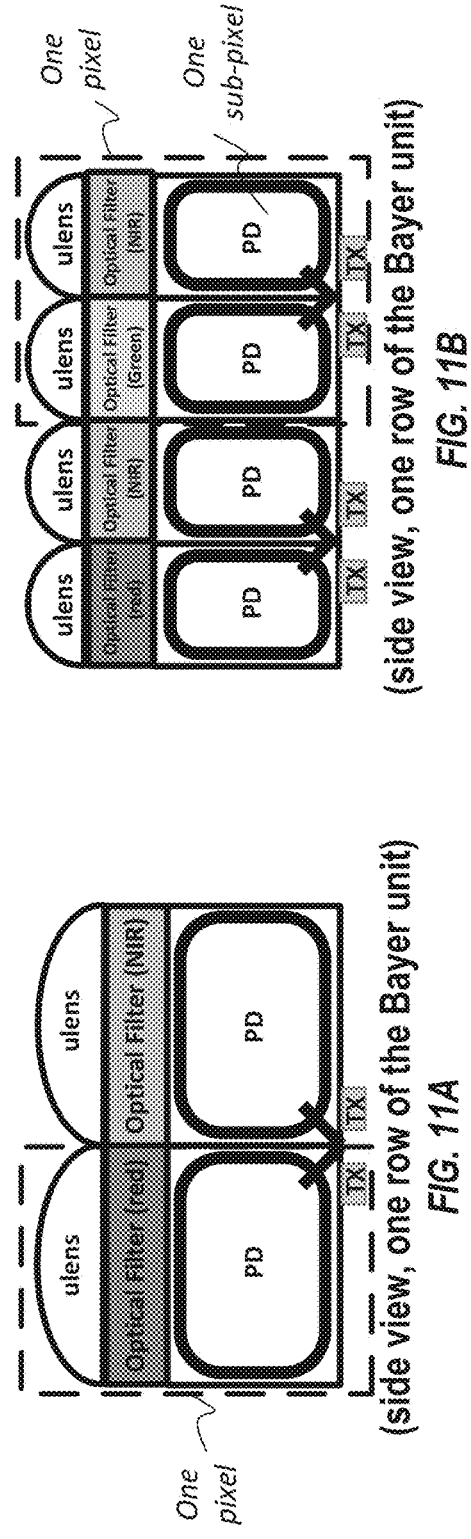
FIG. 11A
FIG. 11B

SYSTEM AND METHOD FOR VISIBLE AND INFRARED HIGH DYNAMIC RANGE SENSING

TECHNICAL FIELD

The present application relates to the technical field of image sensor, and more particularly, to visible and infrared high dynamic range (HDR) sensing.

BACKGROUND

Charge-coupled device (CCD) sensors and Complementary Metal-Oxide Semiconductor (CMOS) sensors are commonly used for visible and infrared (IR) imaging, of which the dynamic range is an important performance indicator. The dynamic range can be defined as the ratio of the highest illuminance to the lowest illuminance that an image sensor can measure with an acceptable output quality. HDR images usually appear crisper and richer than normal images, because of better retention of highlight and shadow details. Capturing HDR images poses great challenges, for the lack of high-performance systems, devices, and methods.

SUMMARY

One aspect of the present disclosure is directed to a high dynamic range sensing device. The device may be a visible, IR, or visible-IR sensing device. The sensing device includes an array of Bayer pattern units. Each of the Bayer pattern units comprises a plurality of pixels. Each of the plurality of pixels comprises a plurality of photodiodes. At least one of the plurality of photodiodes in each pixel is configured to detect near infrared (NIR) light and at least one of the plurality of photodiodes in each of the plurality of pixels is configured to detect visible light.

Another aspect of the present disclosure is directed to another embodiment of a high dynamic range sensing device. The device comprises an array of optical filter combinations. Each of the optical filter combinations may correspond to a pixel of the sensing device and has at least two different filters, and each of the optical filter combinations may be associated with a plurality of photodiodes.

Another aspect of the present disclosure is directed to a high dynamic range sensing device. The sensing device comprises an Bayer array of optical filter combinations. Each of the optical filter combination may correspond to a pixel of the sensing device, and each of the pixel may have a plurality of photodiodes.

Another aspect of the present disclosure is directed to a high dynamic range sensing device. The device may be a visible, IR, or visible-IR sensing device. The device may comprise a plurality of pixels, each comprising four photodiodes, and at least one photodiode in one pixel being configured to detect near infrared (NIR) light.

Additional features and advantages of the present disclosure will be set forth in part in the following detailed description, and in part will be obvious from the description, or may be learned by practice of the present disclosure. The features and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles.

FIG. 2A is a graphical representation illustrating a visualized sensor pixel pattern in prior art.

FIG. 2B is a graphical representation illustrating a visualized sensor pixel pattern with four integration times, consistent with exemplary embodiments of the present disclosure.

FIG. 11A is a graphical representation illustrating a Bayer unit of a RGB-NIR (Red Green Blue-Near Infrared) sensor from both top and side views.

FIG. 11B is a graphical representation illustrating a Bayer unit of a Quadrant Pixel RGB-NIR HDR sensor from both top and side views, consistent with exemplary embodiments of the present disclosure.

DETAILED DESCRIPTION

Figure 1A:
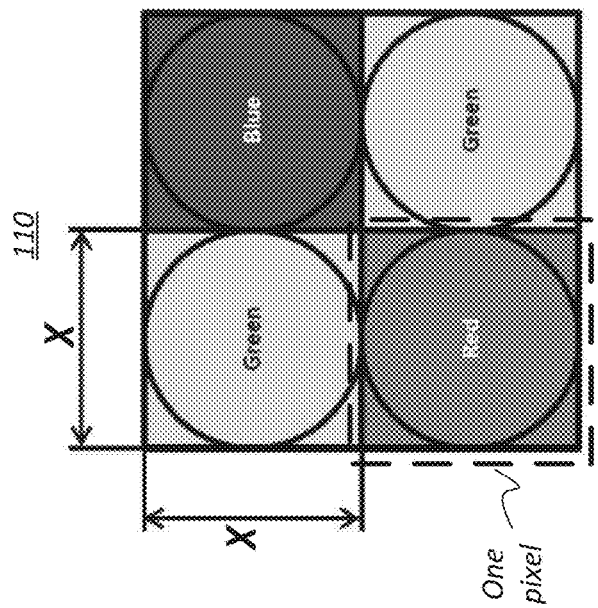
FIG. 1A is a graphical representation illustrating a Bayer unit of a sensor in prior art from both top and side views.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present disclosure do not represent all implementations. Instead, they are merely examples of systems and methods consistent with aspects related to the invention as recited in the appended claims.

Conventional approaches for capturing HDR images are not ideal. Some current technologies produce a HDR image by taking multiple shots of various exposure times and combining features from each shot. Such process may take tens of milli-seconds and is prone to motion artifacts caused by movements. Thus, it is desirable to improve the dynamic range and image quality through innovations in the sensor architecture.

A claimed solution rooted in semiconductor engineering overcomes problems specifically arising in the realm of electronic and optical technology. In various embodiments, a sensing device is disclosed to capture HDR images. The device may comprise an array of optical filters. Each of the optical filters may correspond to a pixel of the sensing device, and each of the optical filters may be associated with one or more photodiodes. Each photodiode may be associated with an integration time, and some of photodiodes of the plurality of photodiodes associated with one optical filter may have different integration times.

In one example, each pixel includes four photodiodes each coupled to a transistor for controlling an integration time of the photodiode. The sensing device may further comprise four micro lenses respectively associated with the four photodiodes. The four photodiodes may be disposed in a two by two configuration under the one optical filter, and the four micro lenses may be disposed in the same two by two (2×2) configuration above the one optical filter and each configured to direct impinging light to pass through the one optical filter to reach the corresponding photodiode. Up to four different integration times can be achieved with the disclosed four-photodiode-pixel system.

The disclosed system may apply to visible sensing (detecting visible light), non-visible sensing (detecting non-visible light), or a combination of both. For example, each of the optical filters may be an optical filter combination of two or more optical filters (e.g., a red filter and a NIR filter). The optical filters only allow light passage of the corresponding wavelength for detection. Thus, RGB-NIR HDR images can be captured with the improved quality.

HDR sensing systems, devices, and methods with various integration times are described with reference to FIGS. 1-5. A simplified HDR sensing system with two different integration times is described with reference to FIGS. 6-10. RGB-NIR HDR sensing systems, devices, and methods with various integration times are described with reference to FIGS. 11-14.

FIG. 1A is a graphical representation 110 illustrating a Bayer unit of a solid-state sensor in prior art from both top and side views. The solid-state (e.g., CCD, CMOS) sensor is the most common type of sensor: Bayer pattern filter sensor. Such sensor comprises an optical filter array arranged on top of a square grid of photodiodes to select red, green, or blue light. From the top view, the four pixels of a Bayer unit are shown as four squares, associated with two green filters across, a red filter, and a blue filter. Each pixel or filter may have identical dimensions of width X. A typical value for width X is 3.0 μm. Each square comprises a circle representing a micro lens (μlens). As shown in the side view, each optical filter has a μlens disposed above and a photodiode (PD) disposed below.

Figure 1B:
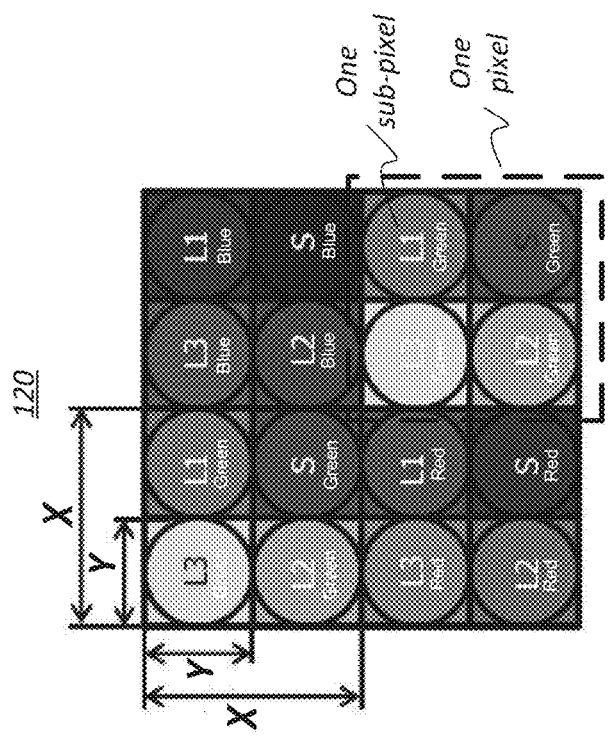
FIG. 1B is a graphical representation illustrating a Bayer unit of a Quadrant Pixel HDR sensor from both top and side views, consistent with exemplary embodiments of the present disclosure.
Figure 1B:
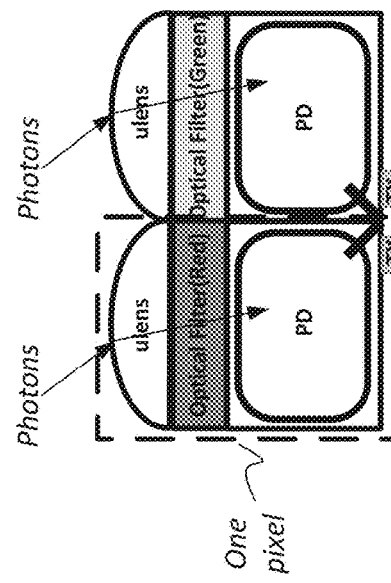
Figure 1B:
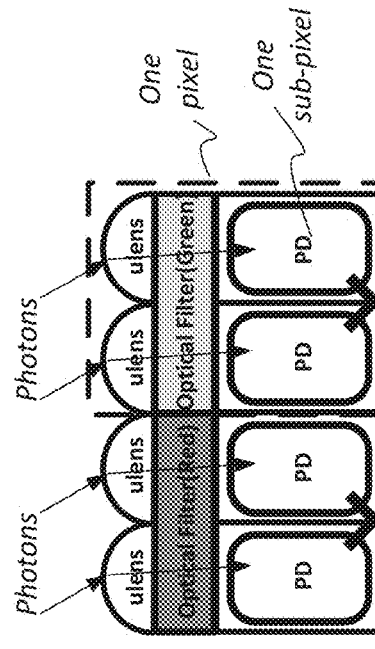

FIG. 1B is a graphical representation 120 illustrating a Bayer unit of a Quadrant Pixel HDR sensor from both top and side views, consistent with exemplary embodiments of the present disclosure. Graphical representation 120 shows four pixels each of width X, the four pixels forming the Bayer unit. The four pixels may also comprise two green filters across, a blue filter, and a red filter respectively. Each pixel may comprise multiple sub-pixels of width Y. In this figure, each pixel of width X comprises four sub-pixels of width Y. Each sub-pixel corresponds to a photodiode. Each photodiode is coupled to a switch, for example a transistor, in a specific example, a charge transferring (TX) transistor, which regulates an integration time of the photodiode. These sub-pixels form a four by four checkerboard pattern in FIG. 1B.

From the top view, corresponding to the four pixels in this Bayer unit, four filters each of width X are shown. Two of the filters across are green, one is red, and the other is blue. Each pixel is subdivided into four sub-pixels each of width Y and labeled as L3, L2, L1, or S. Width Y and width X can have various lengths. An exemplary length for Y is 1.5 μm, and an exemplary length for X is 3.0 μm. Each of the sub-pixels comprises a μlens represented by a circle.

Correspondingly shown in the side view, each sub-pixel has a μlens disposed above the filter and a photodiode disposed below the filter. When light impinges on the sensor, the μlens directs the light/photons to pass through the filter and then to the photodiode, which generates charges (e.g., electrons and holes) in response to the light exposure. Movement of such charges creates a current. To determine how much light/photons hits the sensor, the current is to be measured. The currents produced by the photon conversion are typically very small, which discourages an accurate direct measurement. Thus, current integration is used by setting the voltage across the photodiode to a known potential, and using the photodiode to collect photons for a period of time before the voltage is read out. Longer integration time allows more charges to be converted. The TX transistor coupled to the photodiode is used to regulate the integration time of the photodiode. Each photodiode may be associated with a TX transistor. It is also possible that two or more photodiodes couple to and share the same TX transistor.

In this side view, two sub-pixels share an optical filter (OF)—two μlenses disposed above the filter and two photodiode disposed below the filter. The optical filters disclosed herein may include, but are not limited to, color filters and IR filters. IR radiation spans wavelengths between approximately 750 nanometers (nm) and 1 millimeter (mm). One commonly used sub-division scheme of IR can include near IR (NIR) (0.75-1.1 μm); mid-IR (MIR) (1.1-30 μm); and far IR (FIR) (30-1,000 μm). Thus, IR filters may include NIR filters, MIR filters, FIR filters, etc. In this specification, some embodiments use NIR as an example. For example, the optical filter can be a NIR filter that selects NIR light or allows NIR light to pass through. In some other embodiments, filters that are substantially transparent to ultraviolet (UV) light may be used for UV imaging. Corresponding photodiodes sensitive to UV light may be placed under the UV filters in these types of sensing devices.

Since the side view only shows one row of sub-pixels and each pixel has two rows by two columns of sub-pixels according to the top view, each pixel has one filter shared among the four sub-pixels. That is, in an exemplary 2×2 arrangement, each pixel has four μlenses above a shared filter, four photodiodes below the shared filter, and four TX transistors respectively coupled to the four photodiodes. This configuration gives the name of Quadrant Pixel sensor. Each μlens may be substantially aligned with its corresponding photodiode, such that most of the photons impinging on the μlens can be directed to pass the filter and be detected by the photodiode. FIG. 1B and in association with details described in FIG. 2B, FIG. 4, FIG. 6B, and/or FIG. 7 below disclose a HDR sensing system, consistent with exemplary embodiments of the present disclosure.

As discussed above, in some embodiments, each sub-pixel is connected to a TX transistor for regulating integration times. By this way, the sub-pixels are provided with individually-configurable differential effective integration time for generating HDR images with the sensor. The various integration times may be labeled as L3, L2, L1, or S. L3, L2, L1, or S may correspond to four different integration times from the longest to the shortest. Though FIG. 1B shows four sub-pixels with four integration times in each pixel, the number of sub-pixels in each pixel is not limited to four, and any two of the integration times corresponding to the sub-pixels in each pixel may be the same or different. Each of the integration times may be set in default, configured by users, or otherwise determined. Each of the integration times may also be automatically configured according to luminance conditions (e.g., a longer exposure time is configured for a dark condition). Two or more of the integration times may be the same. Further, any of the sub-pixels of the same pixel may be configured to have integration time L3, L2, L1, or S, or any integration time as configured, which should not be limited to the illustrations in figures herein. Integration time labels L and S in this disclosure are merely exemplary. Also, in exemplary figures of this disclosure, the grey scale of each sub-pixel may indicate the corresponding level of integration times for illustration purposes. For example, L3 as having the longest integration time may appear much brighter than S having the shortest integration time. Again, the grey-scale illustration of integration times is merely exemplary and not tied to particular sub-pixels.

In some embodiments, since each sub-pixel's integration time can be individually controlled by the corresponding TX transistor, each pixel can capture and convert image signals corresponding to four integration times. The integration times may be the same or different. If the pixel has more individually controlled sub-pixels, the image signals captured can correspond to more different integration times. Thus, even in one sensor detection by the disclosed device, each pixel can capture multiple readings corresponding to different integration levels. Captured signals of short integration time may retain highlight detail (e.g., scenes with bright light) while captured signals of long integration time may retain shadow detail (e.g., scenes with low light). These signals can be combined to obtain images and are essential to achieve HDR imaging.

Some existing HDR imaging systems (known as exposure bracketing) capture multiple images with the image sensor, each image having a different exposure time. This capturing process may take tens of milli-seconds. In this case, performing HDR imaging by combining the captured images may generate undesirable motion artifacts. The disclosed system can capture multi-exposure-level images in one exposure detection. Since one detection takes much less time (e.g., under a few milli-seconds) than multiple detections (e.g., tens of milli-seconds), motion artifacts caused by movements can be minimized. In another word, the disclosed system can integrate the times-domain HDR function with minimized motion artifact and multiple integration times.

Similarly, each pixel can be divided into any number of sub-pixels of any shapes, and each sub-pixel can be individually controlled in terms of the integration time, thereby achieving multiple integration times within the same pixel.

Further, the Bayer-pattern described herein may include various modifications in addition to those shown in FIGS. 1A, 1B, 2A, and 2B. In some embodiments, the optical filters in a Bayer-pattern unit may include any color, such as CYGM (cyan, yellow, green, magenta), and RGBE (red, green, blue, emerald), etc. That is, the optical filters are not limited to red, green, and blue filters. In some embodiments, multiple pixels and corresponding filters in a Bayer-pattern unit may be oriented in various configurations, e.g., rotated by 45 degrees. Therefore, any incorporation of the claimed aspect to modified Bayer sensor designs still falls in the scope of this disclosure.

FIG. 2A is a graphical representation 210 illustrating a visualized sensor pixel pattern in prior art. In this figure, 8 rows (labeled as 0 to 7) by 8 columns (labeled as 0 to 7) of 64 square pixels are shown. Similar to FIG. 1A discussed above, each pixel may have a width of X. In fact, representation 210 can be seen as an expansion based on multiplying representation 110 in rows and columns, forming a checker board of pixels. Each Bayer unit of FIG. 2A, consisting of four pixels, is assigned to an integration time: either L (long) or S (short). Every two neighboring Bayer units have different integration times. That is, as the Bayer unit of 2×2 four pixels in the top left corner are assigned to L, the next Bayer unit of 2×2 pixels in the same row or column are assigned to S, and so forth. However, since every pixel here has only one integration time, two Bayer units are required to capture the same image with two integration times, which reduces the image resolution compared to a similar normal sensor with a uniform integration time across all pixels.

FIG. 2B is a graphical representation 220 illustrating a sensor pixel pattern of four integration times, consistent with exemplary embodiments of the present disclosure. In this figure, 8 rows (labeled as 0 to 7) by 8 columns (labeled as 0 to 7) of 64 square pixels are shown. Similar to FIG. 1B discussed above, each pixel may have a width of X=2*Y, and each pixel may comprise four square sub-pixels of width Y. So there are a total of 256 sub-pixels shown in FIG. 2B.

As discussed above with reference to FIG. 1B, each of the sub-pixels can have an individual integration time L3, L2, L1, or S. By achieving integration time variations among sub-pixels of the same pixel rather than among multiple pixels, the resolution of the sensor shown in this figure is not reduced while obtaining HDR images, compared to a similar normal sensor with a uniform integration time across all pixels and with no subpixels.

Figure 3:
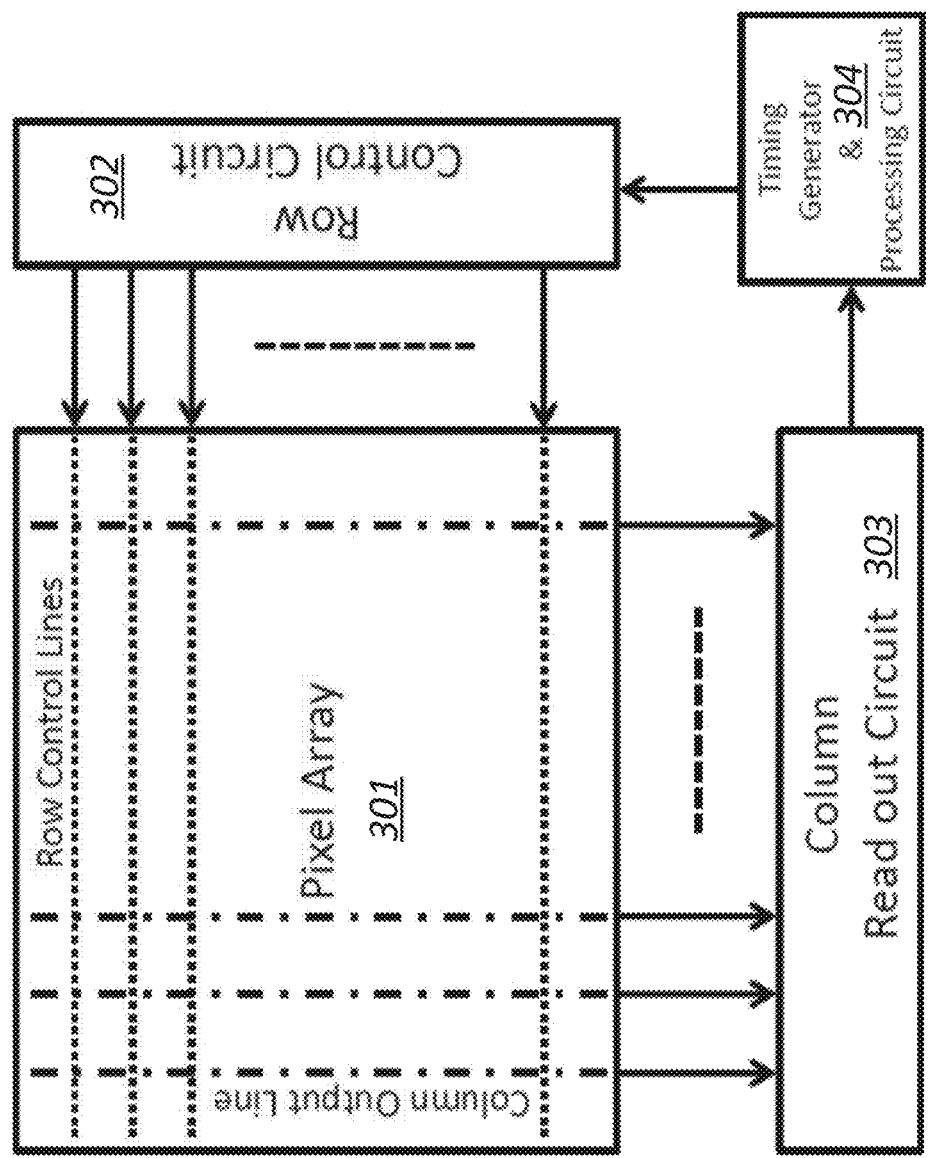
FIG. 3 is a schematic circuit diagram illustrating a HDR sensor system, consistent with exemplary embodiments of the present disclosure.

FIG. 3 is a schematic circuit diagram illustrating a HDR sensor system 300, consistent with exemplary embodiments of the present disclosure. The system 300 may comprise a pixel array 301, a row control circuit 302, a column readout circuit 303, and a timing generator and processing circuit 304. The pixel array 301 may comprise multiple pixels arranged by row and column and associated circuits, e.g., pixels shown in FIG. 1B and FIG. 2B. Each pixel row is coupled to row control circuit 302, and each pixel column is coupled to the column readout circuit 303. The row control circuit 302 may control readout timing in each row, and the column readout circuit 303 may receive pixel signals from each column. The timing generator and processing circuit 304 may control the row control circuit 302 and the column readout circuit 303 in terms of clock timing, signal processing, etc. The above circuit is merely exemplary, and other possible variations of circuit control may be implemented.

During one exemplary exposure of the photodiode sensor, the photodiodes in the pixel array 301 convert impinging photons into charges (e.g., electrons and/or holes). The charges are integrated (collected) in corresponding sensor sub-pixels or pixels. After the completion of integration cycle, collected charges are converted into voltages. The voltages are supplied to the output terminals and coupled to column readout circuit 303. In CMOS image sensors, the charge to voltage conversion is accomplished directly in the pixels themselves. The analog pixel voltage is transferred to the output terminals through various pixel addressing and scanning schemes controlled by the row control circuit 302. The analog signal can also be converted on-chip to a digital equivalent before reaching the chip output.

At the pixel level, corresponding portions of the row control circuit 302, the column readout circuit 303, and/or the timing generator and processing circuit 304 may be collectively deemed as "the circuit coupled to the plurality of photodiodes" described below with reference to FIG. 10.

Figure 4:
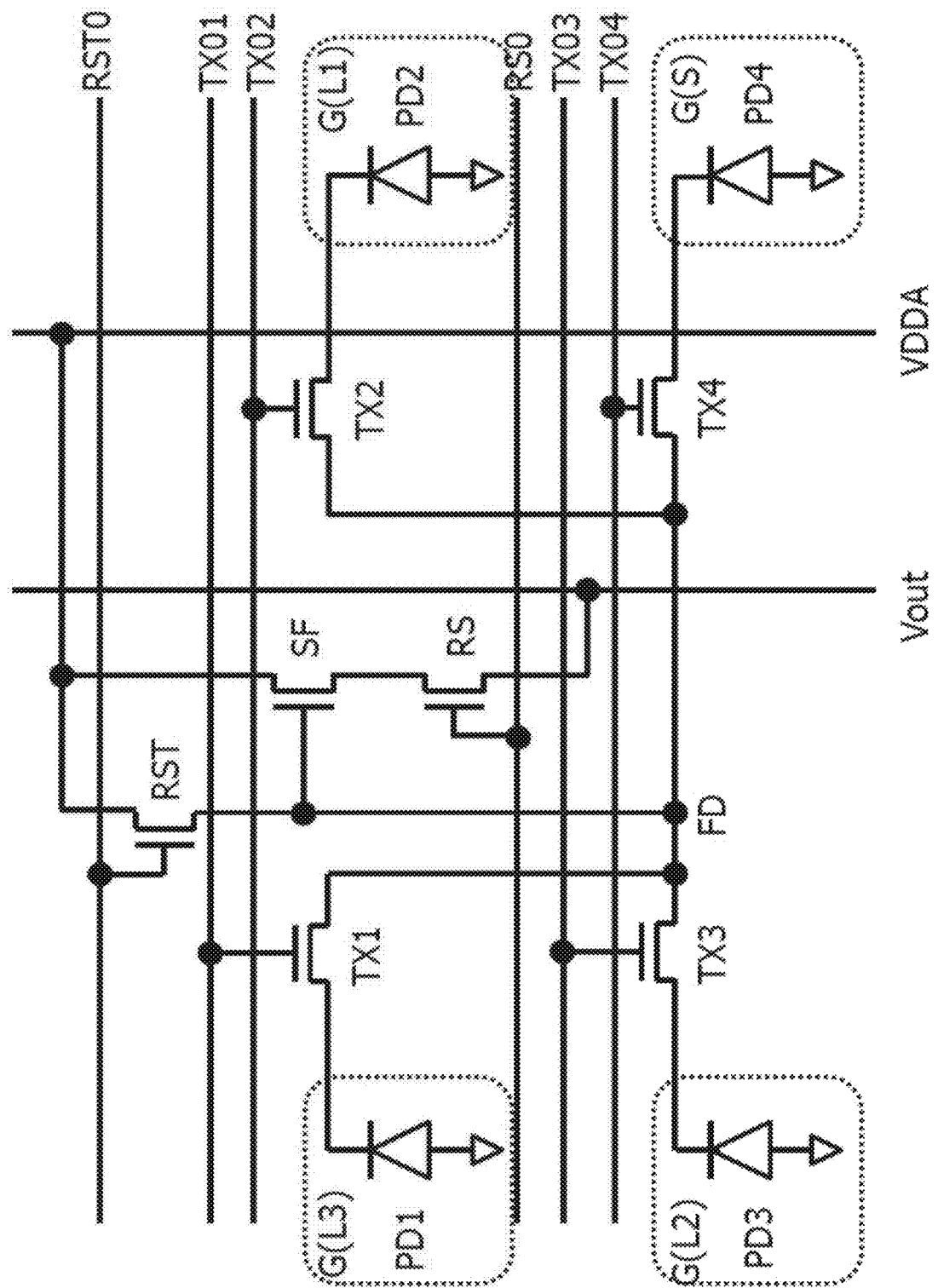
FIG. 4 is a circuit diagram illustrating a HDR sensor pixel with multiple sub-pixels and differential integration times, consistent with exemplary embodiments of the present disclosure.

FIG. 4 is a circuit diagram illustrating a HDR sensor pixel with multiple sub-pixels and differential integration times, consistent with exemplary embodiments of the present disclosure. The circuit diagram of FIG. 4 may correspond to a pixel in FIG. 2B described above.

As shown in FIG. 4, dash regions indicate the four photodiodes (PD1, PD2, PD3, and PD4) of the four sub-pixels, each associated with an integration time (L3, L2, L1, or S). Each of the photodiodes is coupled to a charge transferring (TX) transistor (TX1, TX2, TX3, or TX4), which may optionally operate in a pulsed integration mode. Each TX transistor is coupled to a TX control line (e.g. transistor TX1 is coupled to TX01). The row control circuit 302 may provide corresponding charge transfer control signals through TX01, TX02, TX03, and TX04 shown in FIGS. 4, 5B, and 5C to the gate terminal of each charge transferring transistor TX1, TX2, TX3, and TX4. For example, a first charge transfer control signal TX01 may be provided to charge transferring transistor TX1, a second charge transfer control signal TX02 may be provided to charge transferring transistor TX2, a third charge transfer control signal TX03 may be provided to charge transferring transistor TX3, a fourth charge transfer control signal TX04 may be provided to charge transferring transistor TX4.

The four sub-pixels may share other circuit architectures. For example, the sensor pixel may incorporate a buffer amplifier, typically a source follower (SF) transistor, coupled to the TX transistors. The SF may couple to a sense line (Vout) through a suitable addressing transistor (also can be called a row select transistor RS). The TX transistors are also coupled to a charge detection node (FD) (also referred to as floating diffusion node or floating diffusion region). For example, one of the source or drain terminal of a TX transistor is coupled to the photodiode, and the other is coupled to node FD. As shown in FIG. 4, TX1 is coupled between photodiode PD1 and the node FD, TX2 is coupled between photodiode PD2 and the node FD, TX3 is coupled between photodiode PD3 and the node FD, and TX4 is coupled between photodiode PD4 and the node FD.

The charge detection node FD may be implemented using a region of doped semiconductor (e.g., a doped silicon region formed in a silicon substrate by ion implantation, impurity diffusion, or other doping techniques). The FD region exhibits a capacitance that can be used to detect the charges that has been transferred from photodiodes. The signal associated with the detected charges on FD is applied to the gate of source-follower transistor SF and conveyed to row select transistor RS by source-follower transistor SF.

The FD node is couple to a reset transistor (RST) that conductively couples the FD node to a voltage reference (VDDA). After the charge to voltage conversion as described above is completed and the resulting signal is transferred out from the sub-pixels/pixels through the sense line (Vout), the sub-pixels/pixel can be reset by the RST transistor for accumulation of new charge. In the example shown in FIG. 4, transistor RS is controlled via line RS0. Transistor RST is controlled via line RST0. This reset step removes collected charges, but may generate kTC-reset (thermal) noise. The kTC-reset noise is removed from the signal by the Correlated Double Sampling (CDS) signal processing technique in order to achieve the desired low noise performance. CMOS image sensors that utilize CDS usually require four transistors (4T) in the pixel, one of which serving as the charge transferring (TX) transistor. It is possible to share some of the pixel circuit transistors among several photodiodes to reduce the pixel size.

In some embodiments, the circuit depicted in FIG. 4 may be a part of the pixel array 301, vertical circuit lines such as Vout and VDDA may couple to the column readout circuit 303 of FIG. 3, and horizontal circuit lines such as RST0, RS0, TX01, TX02, TX03, and TX04 may couple to the row control circuit 302 of FIG. 3.

Figure 5A:
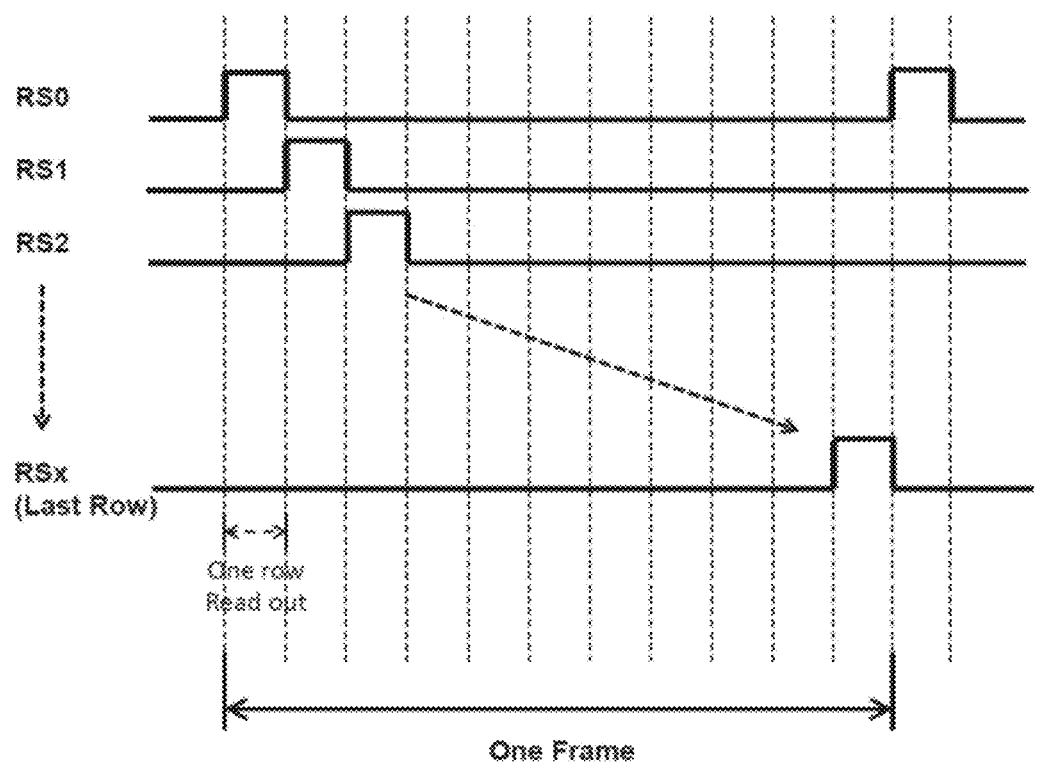
FIG. 5A is a graphical representation illustrating readout timing, consistent with exemplary embodiments of the present disclosure.

FIG. 5A is a graphical representation illustrating readout timing, consistent with exemplary embodiments of the present disclosure. In some embodiments, row addressing or selecting signals RS0, RS1, . . . and RSx each associates with a corresponding row and may indicate row control signals with respect to time. Such row control signals may be implemented by the row control circuit 302 in conjunction with timing generator & processing circuit 304 described above with reference to FIG. 3. Each control signal is represented by a pulse in the corresponding row. The pulse may indicate a voltage (high) with respect to the base line (low). The vertical dash lines indicate clock cycles. When the control signal is high (between two dash lines), it will turn on the row select transistors on that row, and column read out circuit 303 will read out the signals on the row. The rows are read out sequentially one after another from RS0 to RSx. Within one frame, every row is read out, so all signals captured by the sensor are read out. Then, the cycle may repeat for the next frame.

Figure 5B:
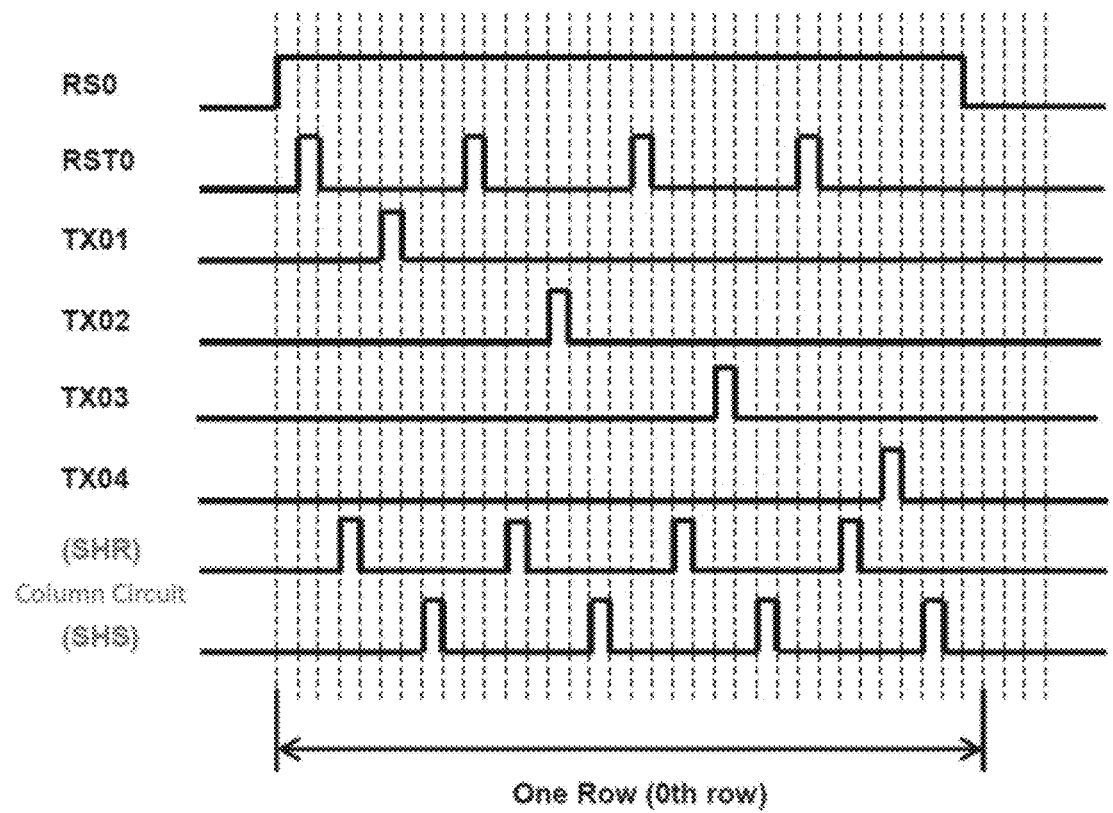
FIG. 5B is a graphical representation illustrating readout timing, consistent with exemplary embodiments of the present disclosure.

FIG. 5B is a graphical representation illustrating readout timing, consistent with exemplary embodiments of the present disclosure. In some embodiments, as shown in FIG. 5B and with reference to FIG. 4, various signal lines on the left may be pulsed with respect to time to read out photodiode signals. For example, as shown in FIG. 5, RS0 is mostly high, and RST0 is pulsed periodically, so that each of the TX01, TX02, TX03, and TX04 signals can be read out individually. For example, TX01, TX02, TX03, and TX04 signals may each be read out when RS0 is high and between two pulses of RST0. SHR (Sample and Hold Pixel Reset Signal) and SHS (Sample and Hold Pixel Signal) are signals provided by the column readout circuit 303 and configured to readout the photodiode signals. Before each TX reading as represented by pulses on TX time lines, SHR signal goes high to hold the reset signal, and after the TX reading, the SHS signal goes high to hold the photodiode signal. Such combination can ensure that the TX reading is properly reset and read out.

An exemplary timing diagram of a reading out time for $0^{th}$ row is described in detail below. When row select signal RS0 for the $0^{th}$ row is high, row select transistor RS is turned on, which enables that the charges on FD and applied on the gate of transistor SF be read out via Vout. In the beginning of this reading out period, the row control circuit 302 may provide the reset control signal RST0, which turns on the reset transistor RST, and resets the charge detection node FD to VDDA level voltage. After reset, the reset control signal RST0 may be deserted to turn off the reset transistor RST. After the reset process is complete, charge transferring transistor control signal or signals (e.g., TX01) may be asserted to turn on corresponding charge transferring transistors (e.g., TX1). When transfer transistors (e.g., TX1) are turned on, the charges that have been generated and integrated by the corresponding photodiodes (e.g., PD1) from the incoming light are transferred to the shared charge detection node FD. As discussed above, row select transistor RS is turned on, the charges on FD and applied on gate of transistor SF can be read out via Vout. After PD1 is read, node FD can be reset, and when TX02 is on, PD2 can be read out. Same operations can be carried out for the other photodiodes. The charge transferring transistors (e.g., TX1, TX2, TX3, and TX4) may be pulsed once to perform one charge transfer operation or may be pulsed multiple times to perform multiple charge transfer operations. In a typical configuration, there are numerous rows and columns of image pixels in the pixel array shown in FIG. 3. When it is desired to read out the value of the detected charges (the value of the detected charges represented by the signal at the source of transistor SF, which is connected to node FD), row select control signals may be asserted, and corresponding image signals Vout that are representative of the magnitude of the charges on shared charge detection node FD (e.g., an image level voltage from one or more photodiodes PD1, PD2, PD3, and PD4) is produced on output Vout in FIG. 4.

Figure 5C:
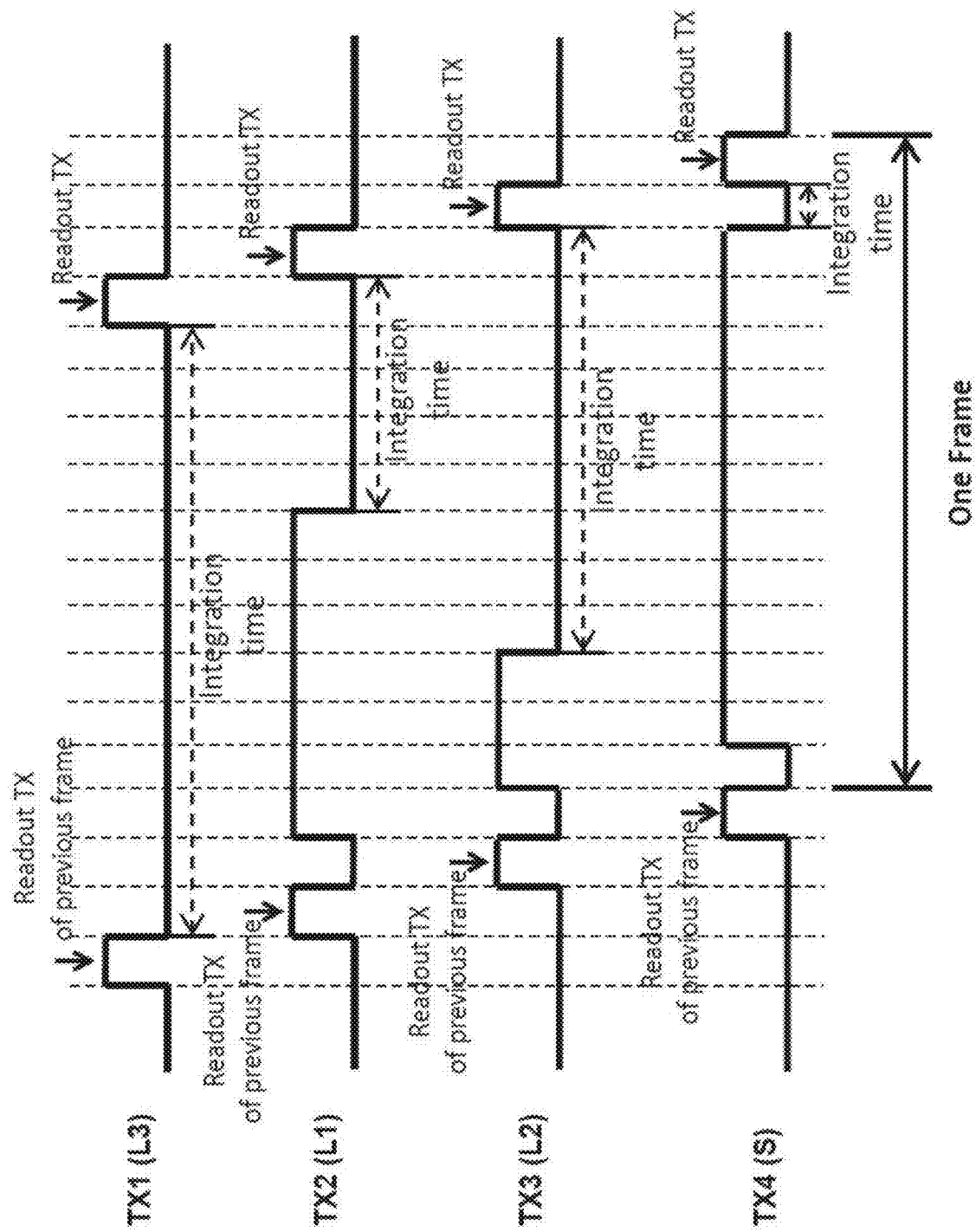
FIG. 5C is a graphical representation illustrating readout timing for the HDR sensor in FIG. 4 with four different integration times, consistent with exemplary embodiments of the present disclosure.

FIG. 5C is a graphical representation illustrating integration timing for the HDR sensor in FIG. 4 with four different integration times, consistent with exemplary embodiments of the present disclosure. FIG. 5C shows signal lines for four TX transistors with respect to time, corresponding to four photodiodes of one pixel and corresponding to integration times L3, L2, L1, and S described above. The TX transistors may operate in a pulsed integration mode to exhibit desired different integration times for HDR imaging. In this figure, the readout for each photodiode starts with the end of a previous TX readout pulse and ends with another TX readout pulse. Within that period, also known as a frame, each TX gate may be associated with an integration time, configurable via clock and timing by the circuits described in FIG. 3.

The voltage across each of the photodiodes and their readout times may be configured by pulses to the corresponding charge transferring transistor TX to set the integration times shown in FIG. 5C. In some embodiments, for example TX2(L1) in FIG. 5C, after the read out pulse (e.g., the first pulse in FIG. 5C), the charge transferring transistor (e.g., TX2) can be turned on again by a high voltage on control line signal TX2(L1), and RST can be turned on again, and charges in the corresponding photodiode (e.g., PD2) are thrown out from the photodiode through the charge transferring transistor TX2 to FD and FD is reset to VDDA through reset transistor RST (referring to FIG. 4). When the charge transferring transistor (e.g., TX2) is low (turned off), charges are allowed to accumulate on the corresponding photodiode (e.g., PD2) for a period of time, shown in FIG. 5C as the integration time. When the control line signal TX2(L1) is pulsed, for example, the pulse at the end of line TX2(L1), the accumulated charges are transferred to node FD, and are read out via SF and RS transistors as the corresponding photodiode signal. The charge transferring transistors (e.g., TX1, TX2, TX3, and TX4) are controlled individually during one frame between a readout and a previous readout. Here, each photodiode in the pixel corresponding a charge transferring transistor has an integration time configurable by a corresponding charge transferring gate timing as shown in FIG. 5C. Each integration time may be set to any length. Thus, according to various integration times, the converted charges are different for each of the four photodiodes, achieving different exposure levels within the same pixel.

As shown above, integration times of four TXs can be controlled independently to achieve HDR imaging with four different integration times. In some embodiments, it is also possible to achieve three different integration times by setting two photodiodes to have the same integration times, or achieve two different integration times by setting two photodiodes to have the same integration time and setting the other two photodiodes to have another same integration time. Details are described below with reference to FIG. 5D and FIG. 5E. Such flexibility in integration time configuration can offer more imaging options. Also, the signal charges in the photodiodes can be combined into the FD node (binning) as described below with reference to FIG. 5F, FIG. 5G, and FIG. 5H. The binning method can increase the readout efficiency and signal to noise ratio.

Figure 5D:
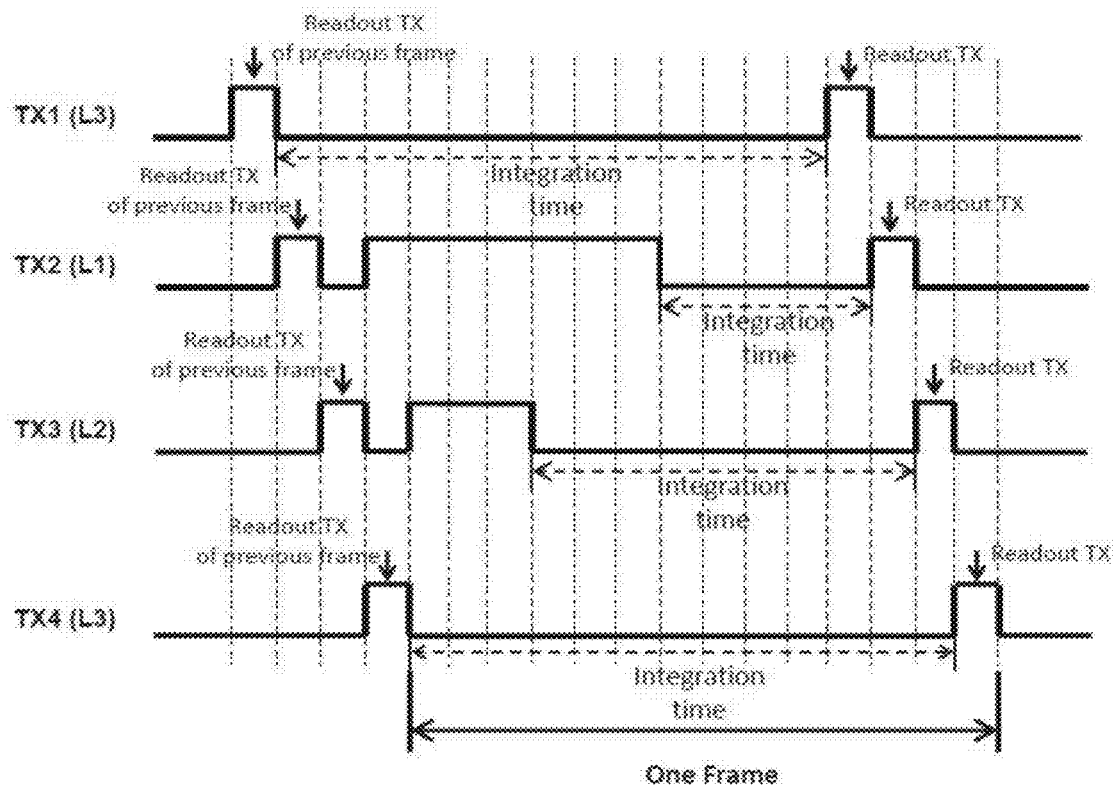
FIG. 5D is a graphical representation illustrating readout timing with three different integration times, consistent with exemplary embodiments of the present disclosure.

FIG. 5D is a graphical representation illustrating readout timing with three different integration times, consistent with exemplary embodiments of the present disclosure. FIG. 5D is similar to FIG. 5C except that the integration time length of the photodiode associated with TX4 is set to be the same as that of the photodiode associated with TX1 (both are L3). Thus, among the four photodiodes associated with TX1, TX2, TX3, and TX4, there are 3 different integration times (correspondingly, L3, L1, L2, and L3).

Figure 5E:
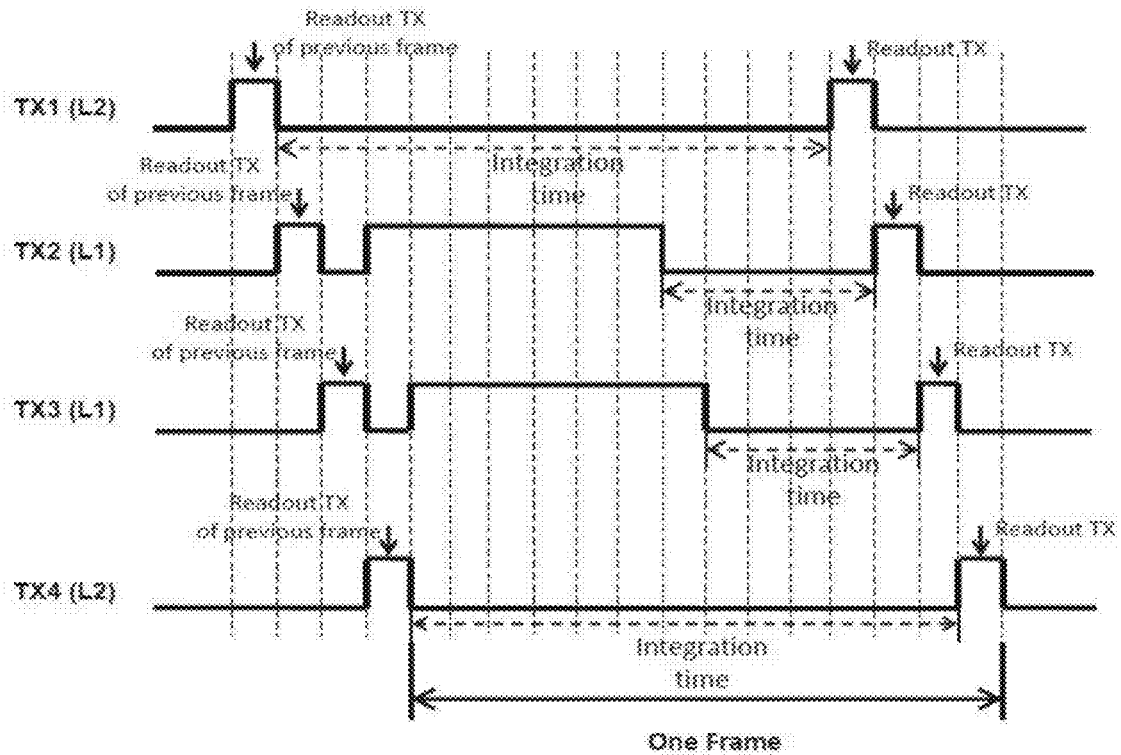
FIG. 5E is a graphical representation illustrating readout timing with two different integration times, consistent with exemplary embodiments of the present disclosure.

FIG. 5E is a graphical representation illustrating readout timing with two different integration times, consistent with exemplary embodiments of the present disclosure. FIG. 5E is similar to FIG. 5D except that the integration time length of the photodiode associated with TX3 is set to be the same as that of the photodiode associated with TX2 (both are L1). Thus, among the four photodiodes associated with TX1, TX2, TX3, and TX4, there are 2 different integration times (correspondingly, L2, L1, L1, and L2).

Figure 5F:
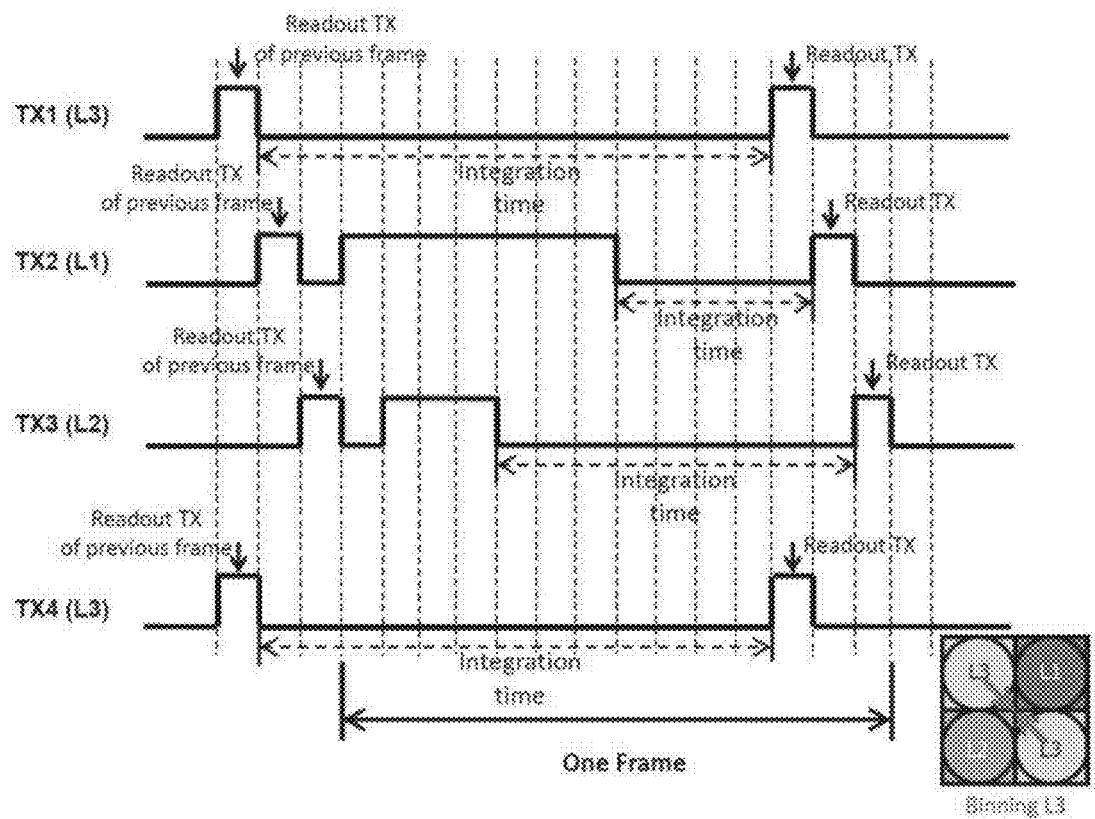
FIG. 5F is a graphical representation illustrating readout timing with three different integration times and binning, consistent with exemplary embodiments of the present disclosure.
Figure 5G:
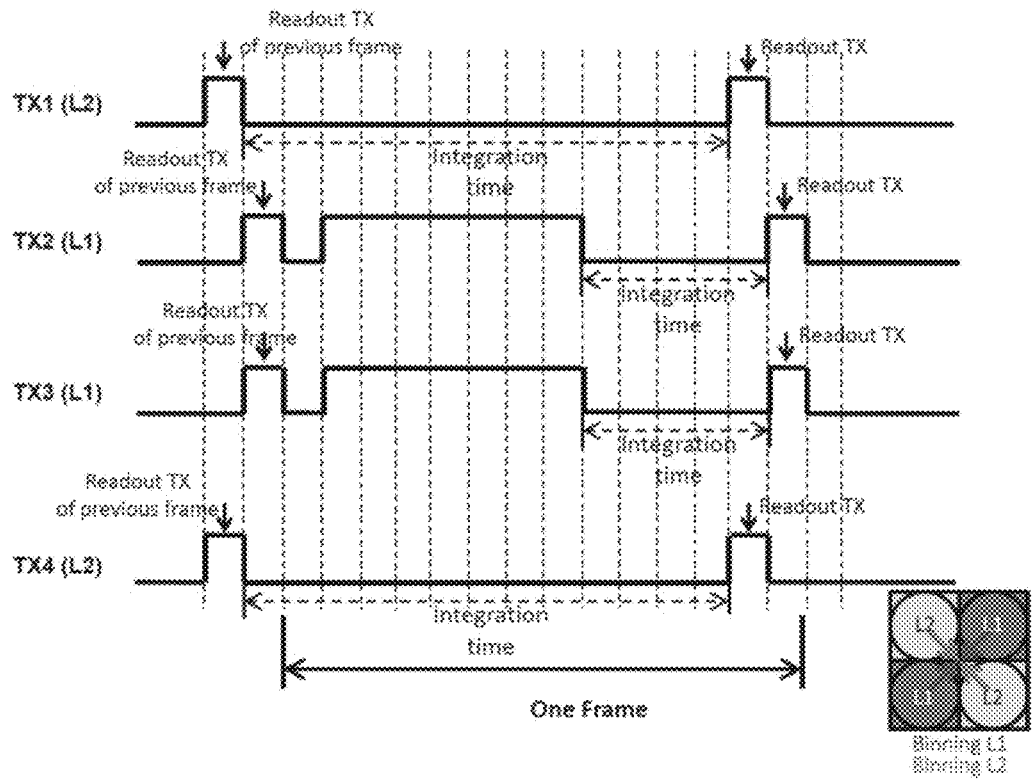
FIG. 5G is a graphical representation illustrating readout timing with two different integration times and binning, consistent with exemplary embodiments of the present disclosure.
Figure 5H:
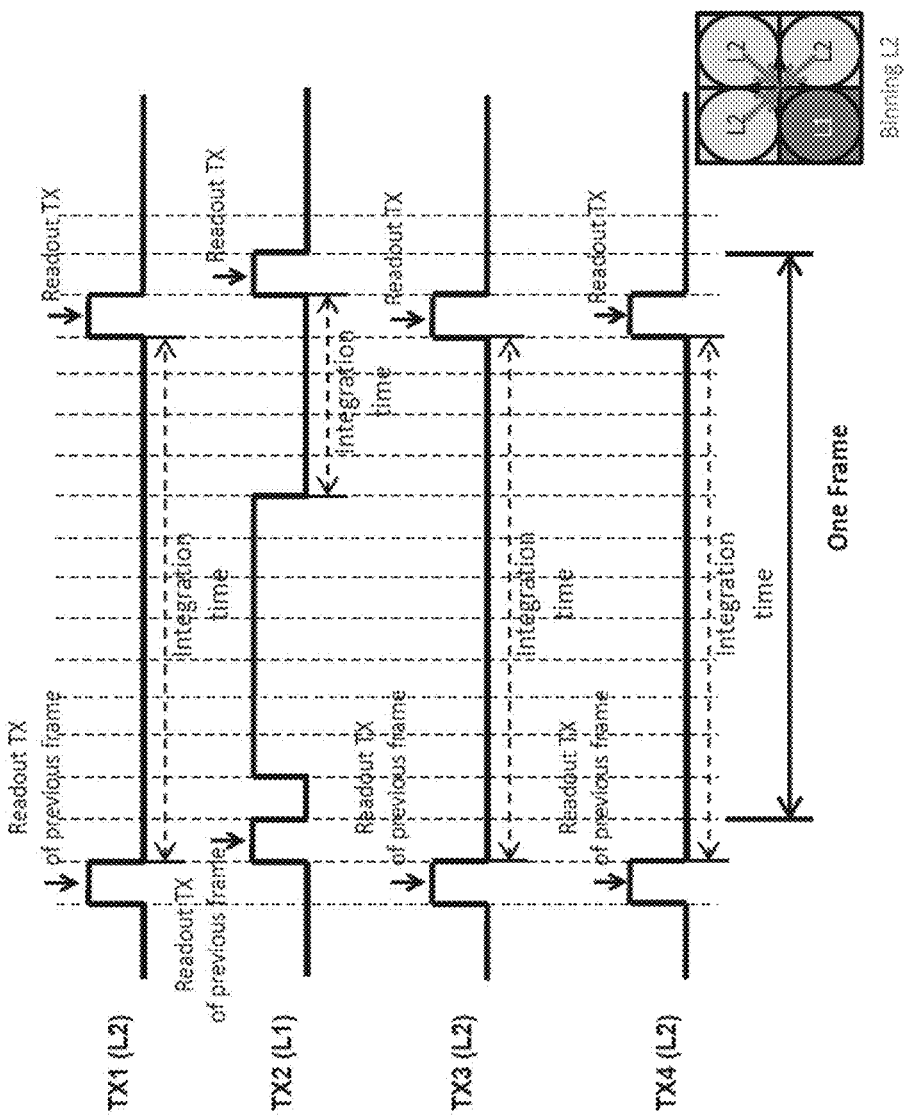
FIG. 5H is a graphical representation illustrating readout timing with two different integration times and binning, consistent with exemplary embodiments of the present disclosure.

FIG. 5F-5H below describe various binning methods, consistent with exemplary embodiments of the present disclosure. Any number of photodiode signals can be binned for readout, and one or more groups of binning can be implemented within each pixel. FIG. 5F is a graphical representation illustrating readout timing with three different integration times and binning, consistent with exemplary embodiments of the present disclosure. FIG. 5F is similar to FIG. 5D except that the integration time of the photodiode associated with TX4 is shifted to align in time with that of the photodiode associated with TX1. Thus, the photodiodes signals associated with TX1 and TX4, having the same integration time, can be combined into the FD node (binning) described in FIG. 4 and thus read out together. Correspondingly shown with arrows in the insert at the bottom right of FIG. 5F, signals from photodiode TX1(L3) and photodiode TX4(L3) can be binned (combined for readout). Signals from the other two photodiodes TX2(L1) and TX3(L2) are not binned with any other photodiode signal because of the difference in the integration time and read out time. Similarly, any two or more photodiodes within the same pixel can be binned for signal readout, if having the same integration time and read out time.

FIG. 5G is a graphical representation illustrating readout timing with two different integration times and binning, consistent with exemplary embodiments of the present disclosure. FIG. 5G is similar to FIG. 5E except that the integration time of the photodiode associated with TX4 is shifted to align in time with that of the photodiode associated with TX1, and that the integration time of the photodiode associated with TX3 is shifted to align in time with that of the photodiode associated with TX2. Thus, the photodiodes signals associated with TX1 and TX4, having the same integration time, can be combined into the FD node (binning) and thus read out together; photodiodes readings associated with TX2 and TX3, having the another same integration time, can be combined into another FD node (binning) and thus read out together. Correspondingly shown with darker and lighter arrows in the insert at the bottom right of FIG. 5G, respectively, signals from the photodiode associated with TX1(L2) and the photodiode associated with TX4(L2) can be binned, and signals from the photodiode associated with TX2(L1) and the photodiode associated with TX3(L1) can be binned.

FIG. 5H is a graphical representation illustrating readout timing with two different integration times and binning, consistent with exemplary embodiments of the present disclosure. As shown in FIG. 5H, the photodiodes associated with TX1, TX3, and TX4 have the same integration time L2, while the photodiode associated with TX2 has the integration time L1. Thus, the photodiodes signals associated with TX1, TX3, and TX4, having the same integration time, can be combined into the FD node (binning) and read out together. Correspondingly shown with arrows in the insert at the bottom right of FIG. 5G, signals from the photodiode associated with TX1(L2), the photodiode associated with TX3(L2), and the photodiode associated with TX4(L2) can be binned.

Figure 6B:
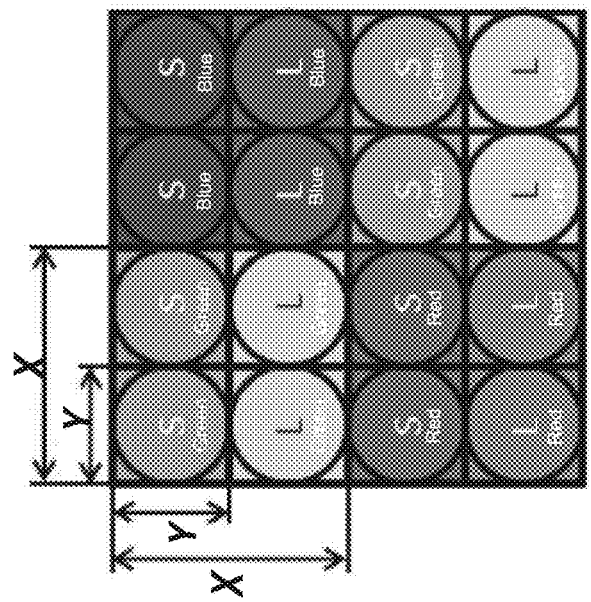
FIG. 6B is a graphical representation illustrating a Bayer unit of a Quadrant Pixel HDR sensor from both top and side views, consistent with exemplary embodiments of the present disclosure.
Figure 6B:
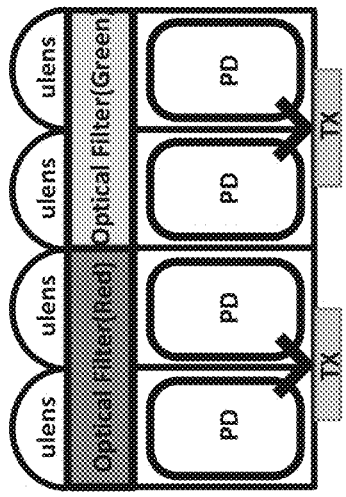
Figure 6A:
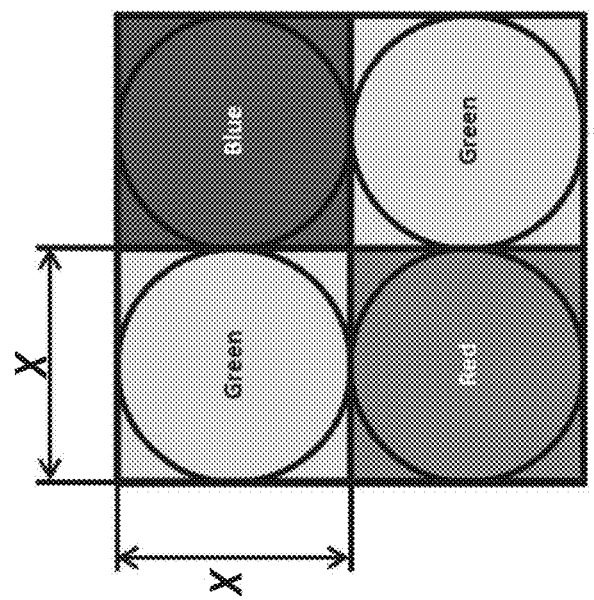
FIG. 6A is a graphical representation illustrating a Bayer unit of a sensor in prior art from both top and side views.
Figure 6A:
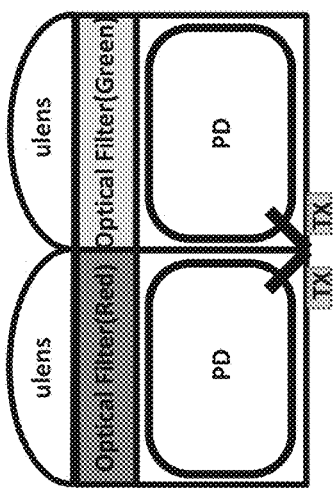

FIGS. 6A, 6B, and 7-9 below illustrate a simplified configuration with respect to the above-described HDR system to achieve two different integration times. FIG. 6A is the same as FIG. 1A and used for comparison with FIG. 6B. FIG. 6B is a graphical representation illustrating a Bayer unit of a Quadrant Pixel HDR sensor from both top and side views, consistent with exemplary embodiments of the present disclosure. FIG. 6B is mostly similar to FIG. 1B, except that in each pixel, two sub-pixels have a shorter integration time (S) and the other two have a longer integration time (L), and two photodiodes share a TX transistor. Thus, in each pixel, four photodiodes corresponding to four sub-pixels can be configured to two groups having different integration times. The grouping may be 2-2 or 1-3. Accordingly, in the side view, sub-pixels having the same integration time within a pixel may share the same TX transistor, for example, by connecting their individual TX transistors electrically with polysilicon or metal wire. Thus, their signals can be combined into a FD node together. Such structure may be simpler and easier to manufacture. Though this figure shows that two sub-pixels next to each other can be grouped and have the same integration time, it is also possible that two sub-pixels across the pixel are grouped to have the same integration time.

Figure 7:
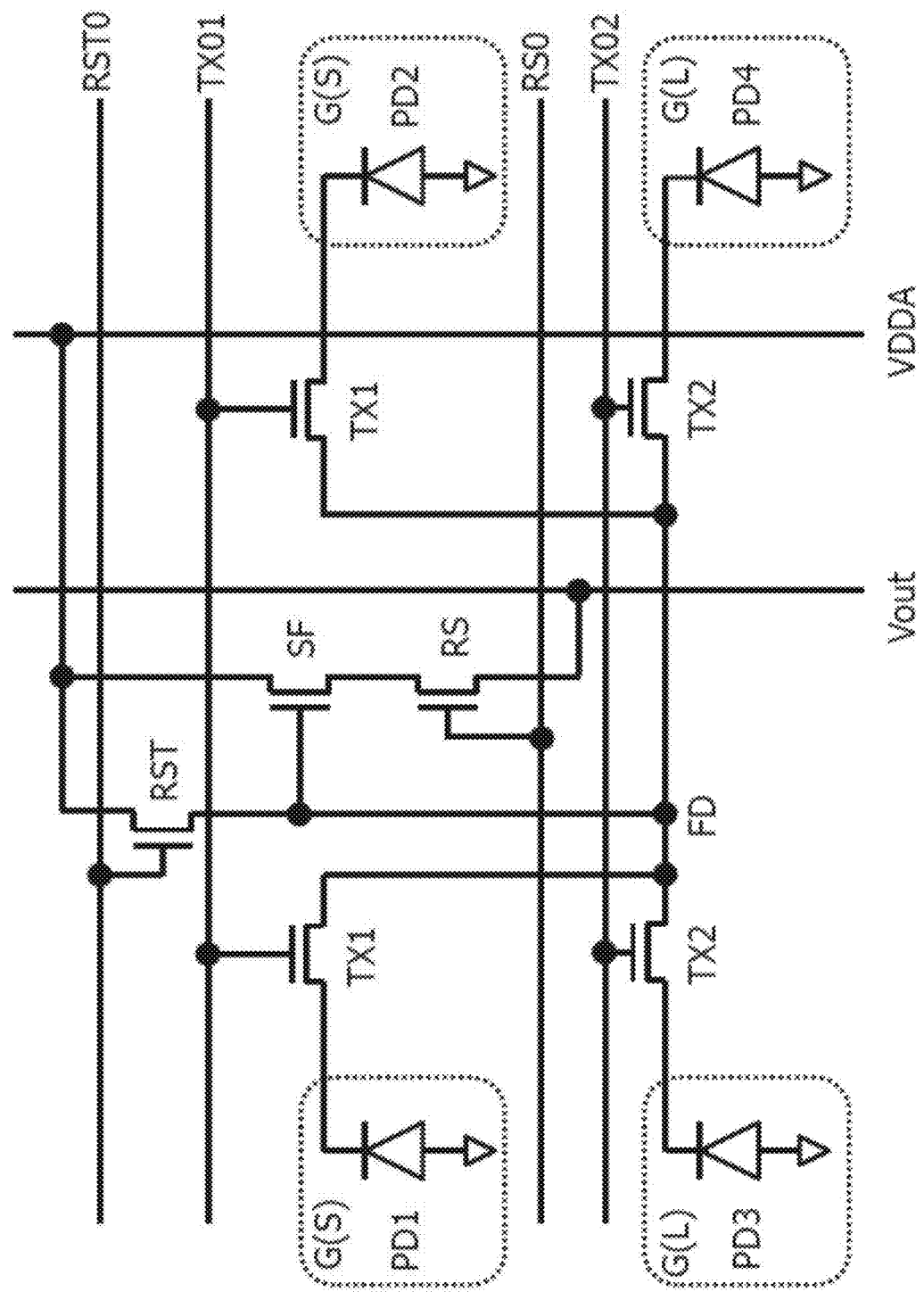
FIG. 7 is a circuit diagram illustrating a HDR sensor pixel with four sub-pixels and two different integration times, consistent with exemplary embodiments of the present disclosure.

FIG. 7 is a circuit diagram illustrating a HDR sensor pixel with four sub-pixels and two different integration times, consistent with exemplary embodiments of the present disclosure. FIG. 7 is similar to FIG. 4, except that two photodiodes have the same integration time S and their corresponding transistors TX1 are electrically connected and coupled to the same control line TX01, and the other two photodiodes have the same integration time L and their corresponding transistors TX2 are electrically connected and coupled to the same control line TX02. The working principles for the circuits in FIG. 7 are similar to the circuit in FIG. 4, except that the TX1s for PD1 and PD2 are controlled by one control line TX01 and TX2s for PD3 and PD4 are controlled by one control line TX02.

Figure 8:
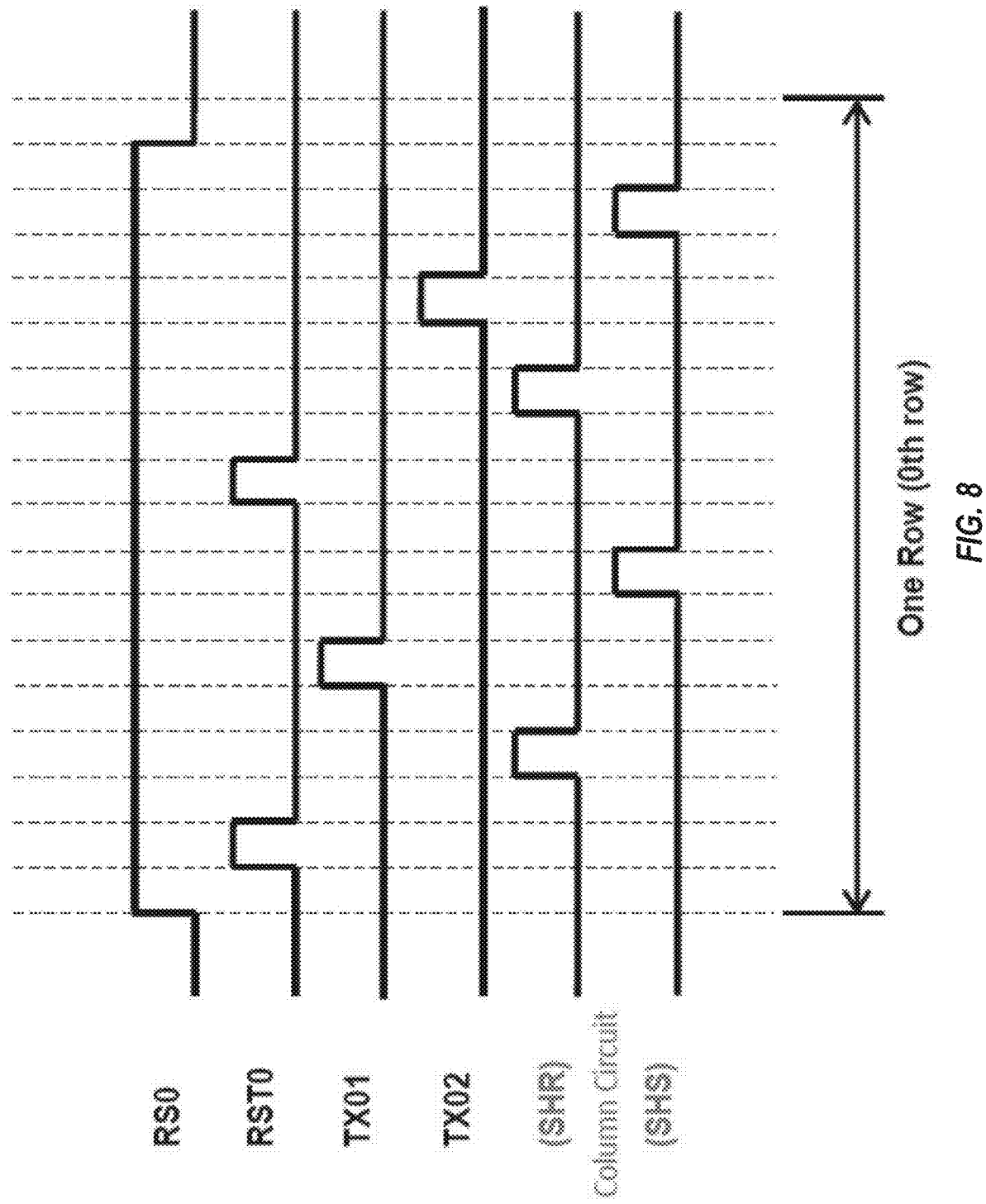
FIG. 8 is a graphical representation illustrating readout timing for the HDR sensor in FIG. 7, consistent with exemplary embodiments of the present disclosure.

FIG. 8 is a graphical representation illustrating readout timing for the HDR sensor in FIG. 7, consistent with exemplary embodiments of the present disclosure. FIG. 8 is similar to FIG. 5B except that only two photodiode signal lines corresponding to TX01 and TX02 are shown. The signals may be read out similarly as described above. The working principle shown in FIG. 8 is similar to that in FIG. 5B.

Figure 9:
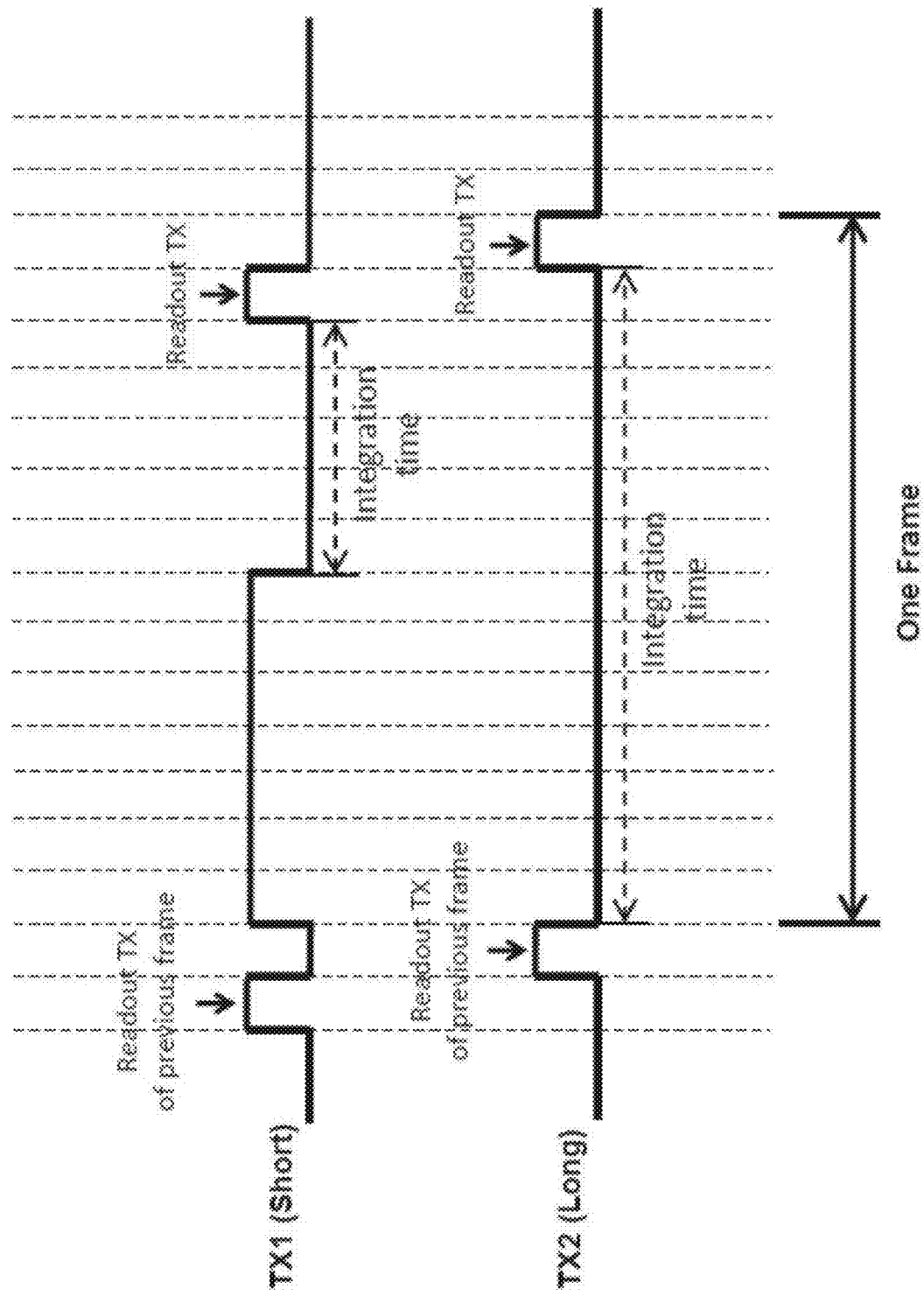
FIG. 9 is a graphical representation illustrating readout timing for the HDR sensor in FIG. 7 with two different integration times, consistent with exemplary embodiments of the present disclosure.

FIG. 9 is a graphical representation illustrating readout timing for the HDR sensor in FIG. 7 with two different integration times, consistent with exemplary embodiments of the present disclosure. FIG. 9 is similar to FIG. 5C except that only two different integration times corresponding TX1 and TX2 are shown. Thus, the two groups of photodiodes are each configured with an integration time to control the exposure levels. The working principle shown in FIG. 9 is similar to that in FIGS. 5C-5H.

Figure 10:
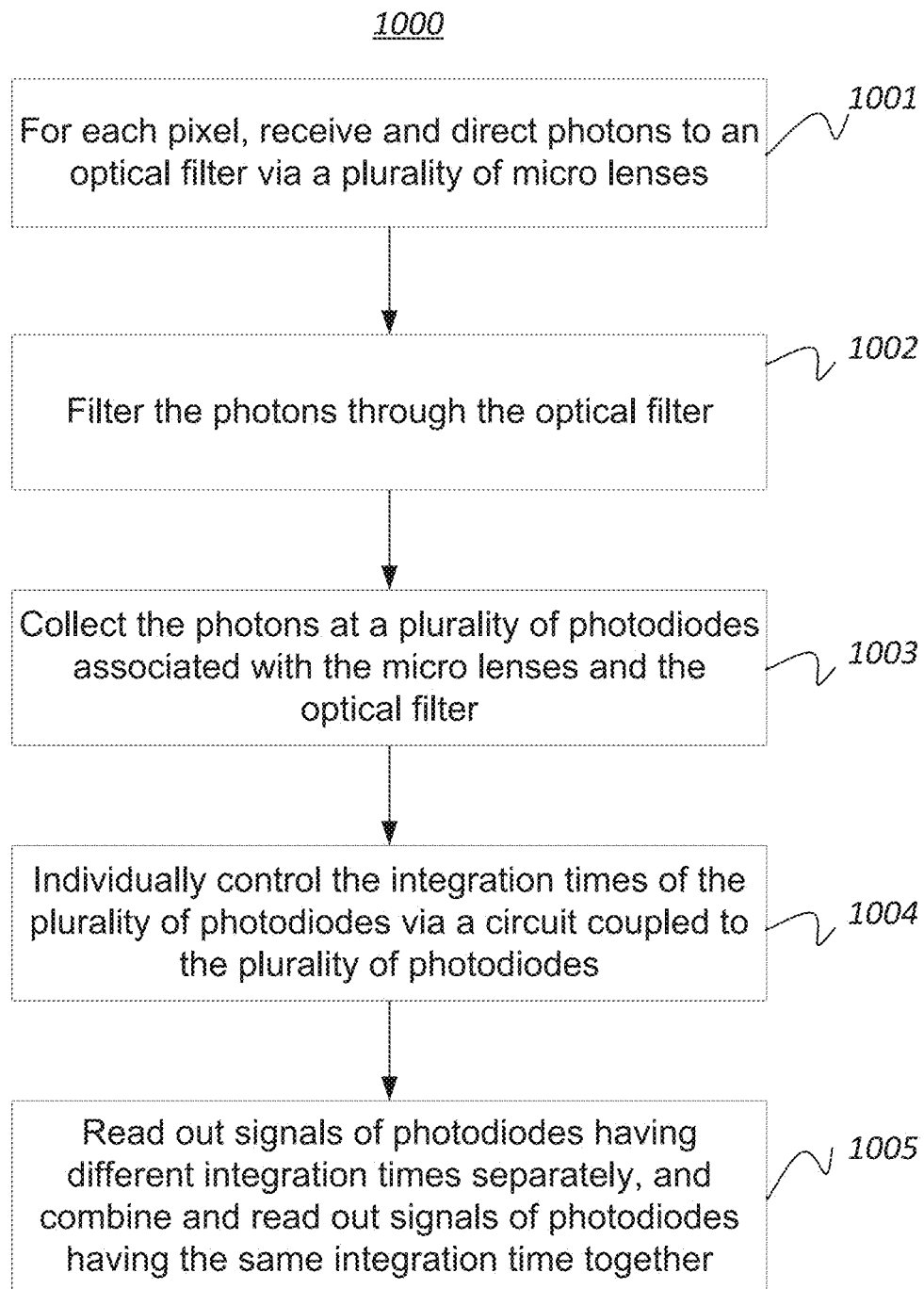
FIG. 10 is a flow diagram illustrating a method for HDR sensing, consistent with exemplary embodiments of the present disclosure.

FIG. 10 is a flow diagram illustrating a method 1000 for HDR sensing, consistent with exemplary embodiments of the present disclosure. The method 1000 may include a number of steps, some of which may be optional (e.g., steps 1001, 1004, and 1005). Method 1000 may be performed by the HDR sensing device or system described herein. As shown above, the sensing device may comprise an array of Bayer-pattern units of optical filters, each of the optical filters corresponding to a pixel of the sensing device, and each of the optical filters overlapping with a plurality of photodiodes. Method 1000 may focus on describing steps with respect to a single pixel. Similarly, such steps may be performed on multiple pixels across a sensing device.

At step 1001, photons may be received and directed to an optical filter via a plurality of micro lenses (e.g., four micro lenses arranged in a 2 by 2 configuration above optical filter).

At step 1002, the photons may be filtered through the optical filter.

At step 1003, the photons may be collected at a plurality of photodiodes associated with the micro lenses and the optical filter (e.g., four photodiodes disposed below the optical filter and substantially aligned with the four micro lenses respectively). Detailed configurations may be referred to FIG. 1B described above. The photons may be converted to charges and the charges accumulate at the photodiode.

At step 1004, the integration times of the plurality of photodiodes are individually controlled via a circuit coupled to the photodiodes. The circuit may be referred to FIG. 3, FIG. 4, and FIG. 7 above. In some embodiments, at least two of the integration times of the plurality of photodiodes in each pixel may be different. In some embodiments, with the structure shown in FIG. 1B, the four photodiodes in one pixel may each have different integration time. A user may also configure the circuit to have two, three, or four out of the four photodiodes in the one pixel to have the same integration time. In view of the disclosure, such configurations should be able to achieve by a person having ordinary skill in the art.

At step 1005, signals of the photodiodes having different integration times may be read out separately, and signals of photodiodes having the same integration time may be combined and read out together via the circuit.

FIGS. 11-14 describe RGB-NIR HDR sensing systems, devices, and methods with various integration times. The RGB-NIR HDR sensing system may be configured to capture images covering both visible and NIR wavelengths. FIG. 11A is a graphical representation 1110 illustrating a Bayer unit of a RGB-NIR (Red Green Blue-Near Infrared) sensor from both top and side views. FIG. 11A is similar to FIG. 1A, except that one of the green filters is replaced with a NIR filter. With a similar working principle as the other optical filters, a NIR filter allows light of a pre-determined wavelength band to pass through and blocks light with other wavelengths. As shown in the top view, each Bayer unit comprises a green filter, a blue filter, a red filter, and a NIR filter, each corresponding to a pixel of the Bayer unit. As shown in the side view, each optical filter has a µlens disposed above and a photodiode disposed below. Though the replacement of the green pixel with the NIR pixel in FIG. 11A allows some NIR detection, resolving power, luminance response, and signal-to-noise ratio (SNR) performance are sacrificed.

FIG. 11B is a graphical representation 1120 illustrating a Bayer unit of a Quadrant Pixel RGB-NIR HDR sensor from both top and side views, consistent with exemplary embodiments of the present disclosure. Graphical representation 1120 shows four pixels each of width X, the four pixels forming the Bayer unit. Each pixel may comprise multiple sub-pixels of width Y. In this figure, each pixel of width X comprises four sub-pixels of width Y. Each sub-pixel corresponds to a photodiode. Each photodiode may be coupled to a switch, for example a transistor, in a specific example, a charge transferring (TX) transistor, which regulates an integration time of the photodiode. Each pixel may also include various optical filters as described below.

The top view of FIG. 11B shows an array of filter combinations, e.g., configurations of filters. From the top view as shown, the Bayer unit may comprise four pixels (e.g., a pixel 1121, etc.). Each pixel may correspond to one optical filter combination. Each pixel may comprise four sub-pixels (e.g., the pixel 1121 comprises sub-pixels 1122, 1123, 1124, and 1125). For each pixel, one or more sub-pixels may correspond to a wavelength band and the other sub-pixel(s) may correspond to another wavelength band (e.g., sub-pixels 1122, 1123, and 1124 correspond to green, and sub-pixel 1125 corresponds to NIR). The corresponding wavelength band may determine the associated optical filter (e.g., sub-pixels 1122, 1123, and 1124 comprise a green filter, sub-pixel 1125 comprises a NIR filter, and the green filter and the NIR filter can be called an optical filter combination). In some embodiments, the NIR filter may be a square filter of width Y. The green filter may comprise three square filters each of width Y. Alternatively, the green filter may be a single filter, as if combining three square filters to form a single L-shaped and materially uniform green filter with length X on each side. Thus, for this green pixel, three quarters of the green pixel corresponds to a green filter (shown as covered by white dotted oblique lines), and the rest quarter of the green pixel corresponds to a NIR filter (shown as covered by black oblique dotted lines). In other words, the filter combination for the green pixel includes one or more green filters covering three green sub-pixels, and one NIR filter covering a NIR sub-pixel. The width Y and width X can have various lengths. An exemplary length for Y is 1.5 µm, and an exemplary length for X is 3.0 µm. Each of the sub-pixels comprises a µlens represented by a circle. Each of the sub-pixels may be labeled by a corresponding light band (e.g., red, green, blue, or NIR) and an integration time (e.g., $L_{NIR}$, L3, L2, or L1). Similar to the green pixel described above, other pixels of the Bayer unit may be configured accordingly.

The µlens-optical filter-photodiode configuration in the vertical direction is shown in the side view. Each photodiode may be paired with a corresponding µlens and an optical filter, all of which are associated with a pre-determined wavelength band (e.g., the associated µlens and optical filter may all be transparent to NIR, and the photodiode can detect NIR light). The optical filter is disposed between the photodiode and the µlens. In this side view, only one row of the sub-pixels are shown, and sub-pixels next to each other are of different wavelength bands, and therefore, their corresponding optical filters are different. In some other embodiments, if sub-pixels next to each other are of the same wavelength band, they may share the same optical filter (e.g., a single piece of materially uniform optical filter covering two or more sub-pixel photodiodes). Thus, in an exemplary two by two arrangement, each pixel has four µlenses above a optical filter combination, four photodiodes below the optical filter combination, and four TX transistors respectively coupled to the four photodiodes. The optical filter combination may comprise a square NIR filter and a L-shaped optical filter (e.g., a blue, red, or green optical filter). The L-shaped optical filter may be a single materially uniform filter as if combining three squares in a "L". Thus, when the NIR filter is combined with the L-shaped optical filter, a large square-shaped optical filter combination is obtained for each pixel. Further, each µlens may be substantially aligned with its corresponding photodiode, such that most of the photons impinging on the µlens can be directed to pass the filter and be detected by the photodiode.

In some embodiments, one or more of the µlens, optical filter, and photodiode in each sub-pixel may selectively work at a predetermined wavelength band (e.g., red, NIR, etc.), such that only the predetermined wavelength band is detected. For example, the μlenses and the photodiodes may cover both visible and NIR wavelength, as long as the corresponding filters can select wavelength bands for detection. A person having ordinary skill in the art should be able to select photodiodes with particular materials sensitive to certain wavelengths. For example, photodiodes that are sensitive to visible light can be placed under RGB filters. Photodiodes that are sensitive to infrared light, or particularly to near infrared light, such as silicon photodiodes (with broad detection spectrum and particular thickness) can be placed under the NIR filter.

As shown in the side view, each sub-pixel has a μlens disposed above the filter and a photodiode disposed below the filter. When light impinges on the sensor, the μlens directs the light/photons to pass through the filter and then to the photodiode, which generates charges (e.g., electrons and holes) in response to the light exposure. Movement of such charges creates a current. To determine how much light/photons hits the sensor, the current is to be measured. The currents produced by the photon conversion are typically very small, which discourages an accurate direct measurement. Thus, current integration may be achieved by setting the voltage across the photodiode to a known potential, and using the photodiode to collect photons for a period of time before the voltage is read out. Longer integration time allows more charges to be converted. The TX transistor coupled to the photodiode is used to regulate the integration time of the photodiode. Each photodiode may be associated with a TX transistor. It is also possible that two or more photodiodes couple to and share the same TX transistor.

In some embodiments, each sub-pixel is connected to a TX transistor for regulating integration times. By this way, the sub-pixels are provided with individually-configurable differential effective integration time for generating HDR images with the sensor. The various integration times may be labeled as L3, L2, L1, or $L_{NIR}$. L3, L2, and L1 may correspond to different integration times from the longest to the shortest. $L_{NIR}$ may be the same as or different from L3, L2, and L1. Though FIG. 11B shows four sub-pixels with four integration times in each pixel, the number of sub-pixels in each pixel is not limited to four, and any two of the integration times corresponding to the sub-pixels in each pixel may be the same or different. Each of the integration times may be set in default, configured by users, or otherwise determined. Each of the integration times may also be automatically configured according to luminance conditions (e.g., a longer exposure time is configured for a dark condition by a luminance sensor and determination software algorithm). Any of the sub-pixels of the same pixel may be configured to have integration time L3, L2, L1, or $L_{NIR}$, or any integration time as configured, which should not be limited to the illustrations in figures herein. Integration time labels L in this disclosure are merely exemplary. Also, in exemplary figures of this disclosure, the grey scale of each sub-pixel may indicate the corresponding level of integration times for illustration purposes. For example, L3 as having the longest integration time may appear much brighter than L2, L1, or S having the shortest integration time. Again, the grey-scale illustration of integration times is merely exemplary and not tied to particular sub-pixels.

Further, the Bayer-pattern described herein may include various modifications in addition to those shown in FIGS. 11A and 11B. In some embodiments, the optical filters in a Bayer-pattern unit may include any color, such as CYGM (cyan, yellow, green, magenta), and RGBE (red, green, blue, emerald), etc. That is, the optical filters are not limited to red, green, and blue filters. In some embodiments, multiple pixels and corresponding filters in a Bayer-pattern unit may be oriented in various configurations, e.g., rotated by 45 degrees. Therefore, any incorporation of the claimed aspect to modified Bayer sensor designs still falls in the scope of this disclosure. As such, each pixel can be divided into any number of sub-pixels of any shapes, and each sub-pixel can be individually controlled in terms of the integration time, thereby achieving multiple integration times within the same pixel.

In some embodiments, since each sub-pixel's integration time can be individually controlled by the corresponding TX transistor, each pixel can capture and convert image signals corresponding to four integration times. The integration times may be the same or different. If the pixel has more individually controlled sub-pixels, the image signals captured can correspond to more different integration times. Thus, even in one sensor detection by the disclosed device, each pixel can capture multiple readings corresponding to different integration levels. Captured signals of short integration time may retain highlight detail (e.g., scenes with bright light) while captured signals of long integration time may retain shadow detail (e.g., scenes with low light). These signals can be combined to obtain images and are essential to achieve HDR imaging. Further, with the incorporation of the NIR sub-pixel, NIR light can be captured along with the visible light to achieve NIR imaging.

A sensor may comprise an array of Bayer units, and each Bayer unit may comprise an array of pixels as shown in FIG. 11B. Thus, in some embodiments, the disclosed sensing device may comprise an array of optical filter combinations. Each of the optical filter combinations may correspond to a pixel of the sensing device and have at least two different filters (e.g., the green filter and the NIR filter), and each of the optical filter combinations may be associated with a plurality of photodiodes (e.g., four photodiodes). Each of the filter combination may comprise at least one Red-Green-Blue (RGB) filter and at least one near-infrared (NIR) filter. The RGB filter may be a red color filter, a green color filter, or a blue color filter. For example, the plurality of photodiodes may comprise four photodiodes, at least one NIR filter may cover one of the four photodiodes, and at least one RGB filter may cover three of the four photodiodes other than the photodiode covered by at least one NIR filter. The pixel may comprise four sub-pixels in a two by two array, at least one NIR filter may correspond to one of the four sub-pixels, and at least one RGB filter may correspond to three of the four sub-pixels other than the sub-pixel corresponding to at least one NIR filter.

In some exemplary embodiments, for each Bayer pattern unit, as shown in FIG. 11B, a first pixel of the plurality of pixels may comprise one or more first green filters covering one or more of the first pixel's photodiodes and may comprise a first near infrared (NIR) filter covering one of the first pixel's photodiodes; a second pixel of the plurality of pixels may comprise one or more blue filters covering one or more of the second pixel's photodiodes and may comprise a second NIR filter covering one of the second pixel's photodiodes; a third pixel of the plurality of pixels may comprise one or more red filters covering one or more of the third pixel's photodiodes and may comprise a third NIR filter covering one of the third pixel's photodiodes; and a fourth pixel of the plurality of pixels may comprise one or more second green filters covering one or more of the fourth pixel's photodiodes and may comprise a fourth NIR filter covering one of the fourth pixel's photodiodes. Further, the one or more first green filters may be a single materially uniform filter, and the same may apply to the one or more blue filters, the one or more red filters, and the one or more second green filters.

Figure 12:
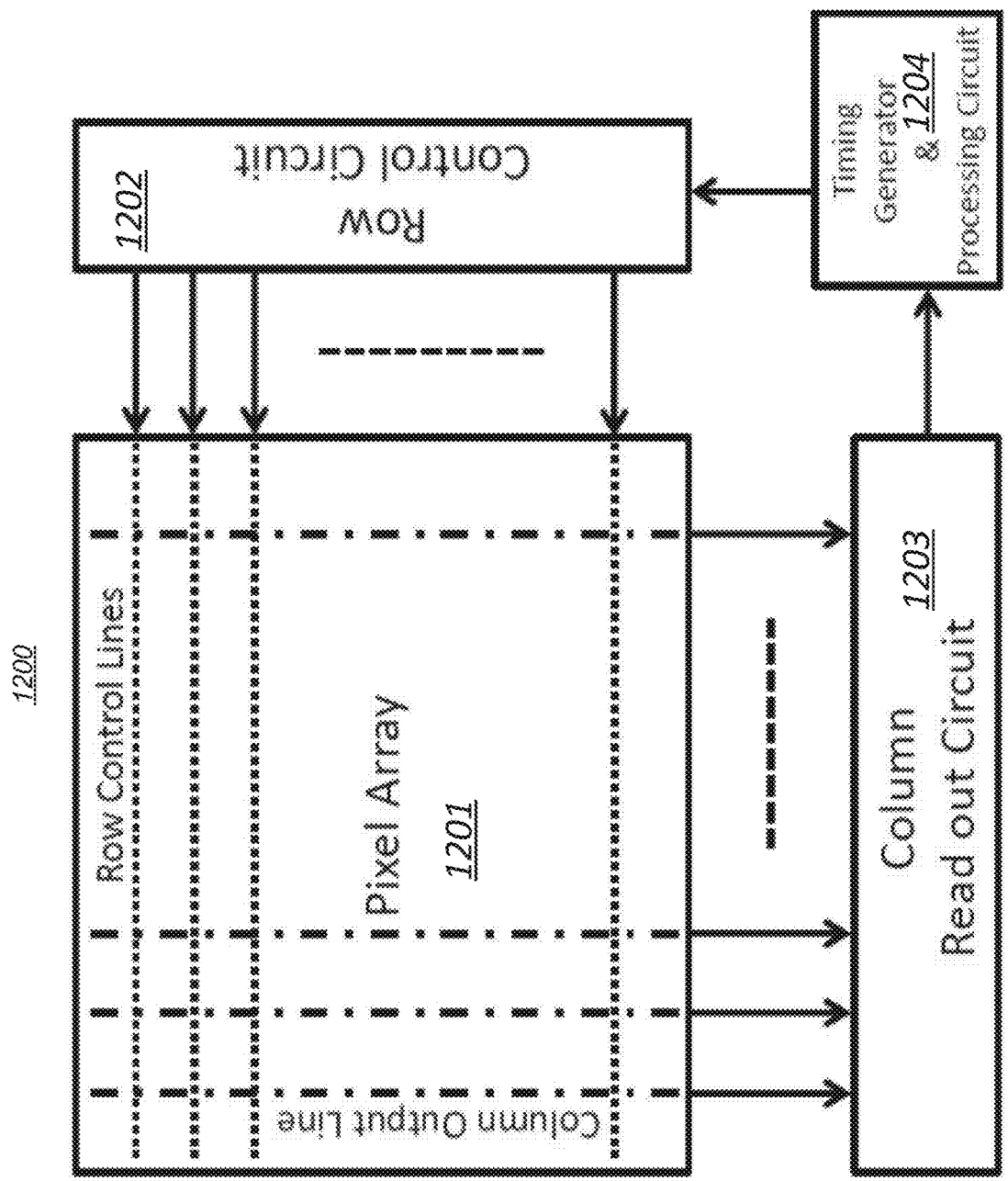
FIG. 12 is a schematic circuit diagram illustrating a RGB-NIR HDR sensor system, consistent with exemplary embodiments of the present disclosure.

FIG. 12 is a schematic circuit diagram illustrating a RGB-NIR HDR sensor system 1200, consistent with exemplary embodiments of the present disclosure. The system 1200 may comprise a pixel array 1201, a row control circuit 1202, a column readout circuit 1203, and a timing generator and processing circuit 1204. The pixel array 1201 may comprise multiple pixels arranged by row and column and associated circuits, e.g., pixels shown in FIG. 11B. Each pixel row is coupled to row control circuit 1202, and each pixel column is coupled to the column readout circuit 1203. The row control circuit 1202 may control readout timing in each row, and the column readout circuit 1203 may receive pixel signals from each column. The timing generator and processing circuit 1204 may control the row control circuit 1202 and the column readout circuit 1203 in terms of clock timing, signal processing, etc. The above circuit is merely exemplary, and other possible variations of circuit control may be implemented.

During one exemplary exposure of the photodiode sensor, the photodiodes in the pixel array 1201 convert impinging photons into charges (e.g., electrons and/or holes). The charges are integrated (collected) in corresponding sensor sub-pixels or pixels. After the completion of integration cycle, collected charges are converted into voltages. The voltages are supplied to the output terminals and coupled to column readout circuit 1203. In CMOS image sensors, the charge to voltage conversion is accomplished directly in the pixels themselves. The analog pixel voltage is transferred to the output terminals through various pixel addressing and scanning schemes controlled by the row control circuit 1202. The analog signal can also be converted on-chip to a digital equivalent before reaching the chip output.

In some embodiments, the timing generator and processing circuit 1204 may be configured to perform demosaicing and apply a chroma filter to the white-balanced image signals from the column readout circuit 1203. The chroma filter may be applied to chroma de-noise the white-balanced image signals from the column readout circuit 1203. The timing generator and processing circuit 1204 may, for example, demosaic the image signals and apply the chroma filter simultaneously, sequentially, or in an interspersed manner. The chroma filter may increase noise correlation between image signals of each color (e.g., noise fluctuations in the blue, green, red and infrared channels may increase or decrease together in a correlated manner). For example, the timing generator and processing circuit 1204 may increase the correlated noise between the blue, green, red and infrared image signals. By increasing noise correlation, the timing generator and processing circuit 1204 may reduce the amount of noise amplification generated.

The pixels that are sensitive to light in the visible light spectrum (e.g., blue pixels, green pixels, red pixels, etc.) may sometimes be referred to herein as visible light pixels. In scenarios where an infrared filter is formed across each of the pixels in the pixel array 1201, a portion of the image signals captured by the visible light pixels (e.g., blue pixels, green pixels, red pixels, etc.) in the pixel array 1201 may be generated in response to infrared light. Infrared light captured by the visible image pixels can cause visible light pixels to generate erroneous pixel values.

The timing generator and processing circuit 1204 may perform infrared image signal contamination subtraction operations on the chroma filter and demosaicked image data. The timing generator and processing circuit 1204 may determine an estimated value of the portion of the image signal of each color that was generated in response to infrared light. The timing generator and processing circuit 1204 may subtract the estimated value from the image signals to remove the infrared light contribution to the image signals.

At the pixel level, corresponding portions of the row control circuit 1202, the column readout circuit 1203, and/or the timing generator and processing circuit 1204 may be collectively deemed as "the circuit coupled to the plurality of photodiodes" described below.

Figure 13:
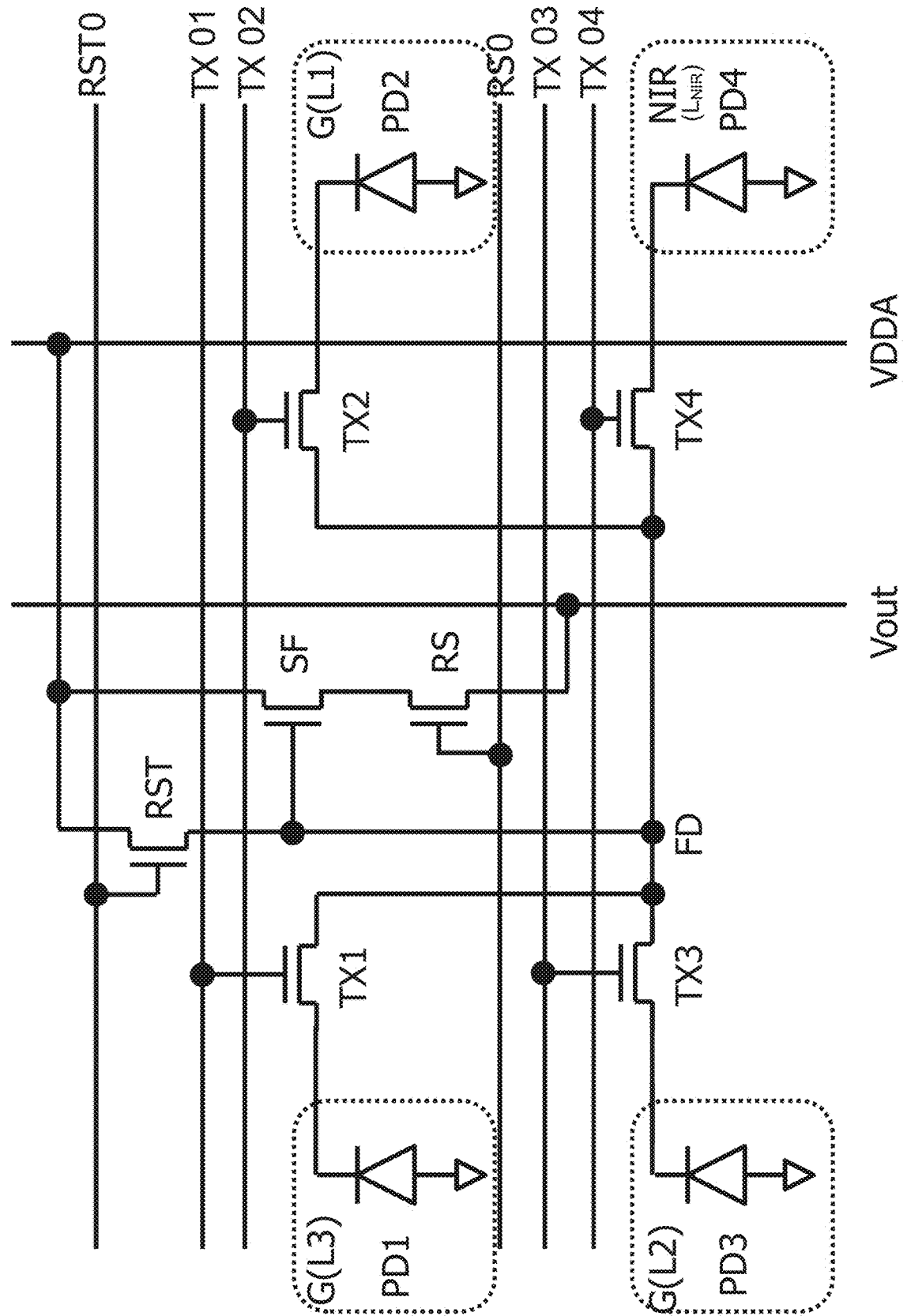
FIG. 13 is a circuit diagram illustrating a RGB-NIR HDR sensor pixel with multiple sub-pixels and differential integration times, consistent with exemplary embodiments of the present disclosure.

FIG. 13 is a circuit diagram illustrating a RGB-NIR HDR sensor pixel with multiple sub-pixels and differential integration times, consistent with exemplary embodiments of the present disclosure. The circuit diagram of FIG. 13 may correspond to a pixel in FIG. 11B described above.

As shown in FIG. 13, dash regions indicate the four photodiodes (PD1, PD2, PD3, and PD4) of the four sub-pixels, each associated with an integration time (L3, L2, L1, or $L_{NIR}$). As discussed above, an integration time corresponds to the time for the corresponding photodiode to collect charges caused by the impinging photons. Each of the photodiodes is coupled to a charge transferring (TX) transistor (TX1, TX2, TX3, or TX4), which may optionally operate in a pulsed integration mode. Each TX transistor is coupled to a TX control line (e.g. transistor TX1 is coupled to TX01). The row control circuit 1202 may provide charge transfer control signals through TX01, TX02, TX03, and TX04 to the gate terminal of each charge transferring transistor TX1, TX2, TX3, and TX4. For example, a first charge transfer control signal TX01 may be provided to charge transferring transistor TX1, a second charge transfer control signal TX02 may be provided to charge transferring transistor TX2, a third charge transfer control signal TX03 may be provided to charge transferring transistor TX3, a fourth charge transfer control signal TX04 may be provided to charge transferring transistor TX4.

The four sub-pixels may share certain circuit architectures. For example, the sensor pixel may incorporate a buffer amplifier, typically a source follower (SF) transistor, coupled to the TX transistors. The SF may be coupled to a sense line (Vout) through a suitable addressing transistor (also can be called a row select transistor RS). The TX transistors are also coupled to a charge detection node (FD) (also referred to as floating diffusion node or floating diffusion region). For example, one of the source or drain terminal of a TX transistor is coupled to the photodiode, and the other is coupled to node FD. As shown in FIG. 13, TX1 is coupled between photodiode PD1 and the node FD, TX2 is coupled between photodiode PD2 and the node FD, TX3 is coupled between photodiode PD3 and the node FD, and TX4 is coupled between photodiode PD4 and the node FD.

The charge detection node FD may be implemented using a region of doped semiconductor (e.g., a doped silicon region formed in a silicon substrate by ion implantation, impurity diffusion, or other doping techniques). The FD region exhibits a capacitance that can be used to detect the charges that has been transferred from photodiodes. The signal associated with the detected charges on FD is applied to the gate of source-follower transistor SF and conveyed to row select transistor RS by source-follower transistor SF.

The FD node is coupled to a reset transistor (RST) that conductively couples the FD node to a voltage reference (VDDA). After the charge to voltage conversion as described above is completed and the resulting signal is transferred out from the sub-pixels/pixels through the sense line (Vout), the sub-pixels/pixel can be reset by the RST transistor for accumulation of new charge. In the example shown in FIG. 13, transistor RS is controlled via line RS0. Transistor RST is controlled via line RST0. This reset step removes collected charges, but may generate kTC-reset (thermal) noise. The kTC-reset noise is removed from the signal by the Correlated Double Sampling (CDS) signal processing technique in order to achieve the desired low noise performance. CMOS image sensors that utilize CDS usually require four transistors (4T) in the pixel, one of which serves as the charge transferring (TX) transistor. It is possible to share some of the pixel circuit transistors among several photodiodes to reduce the pixel size.

In some embodiments, the circuit depicted in FIG. 13 may be a part of the pixel array 1201, vertical circuit lines such as Vout and VDDA may couple to the column readout circuit 1203 of FIG. 12, and horizontal circuit lines such as RST0, RS0, TX01, TX02, TX03, and TX04 may couple to the row control circuit 1202 of FIG. 12.

Figure 14:
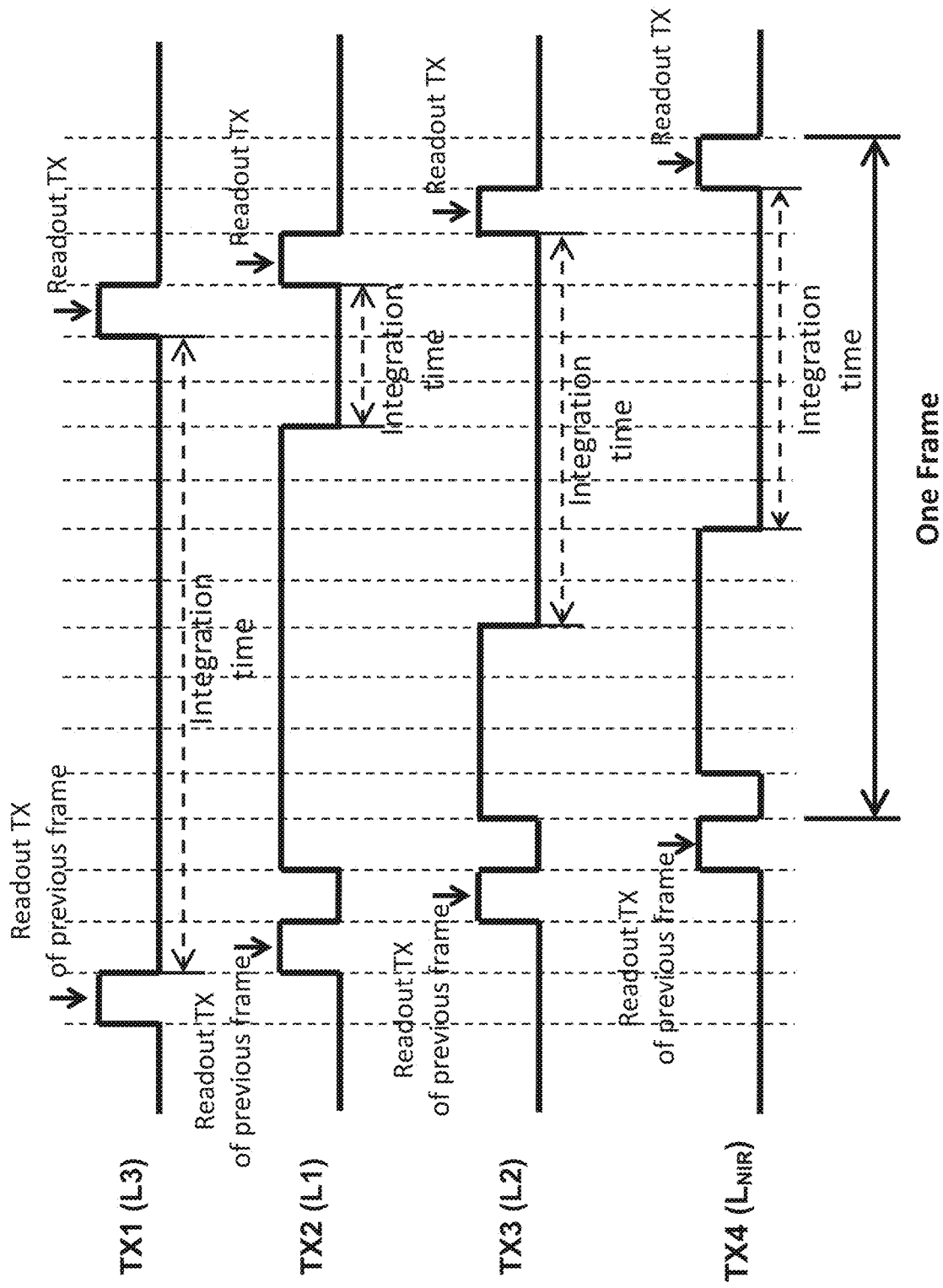
FIG. 14 is a graphical representation illustrating readout timing for the RGB-NIR HDR sensor in FIG. 13 with differential integration times, consistent with exemplary embodiments of the present disclosure.

FIG. 14 is a graphical representation illustrating readout timing for the RGB-NIR HDR sensor in FIG. 13 with differential integration times, consistent with exemplary embodiments of the present disclosure. FIG. 14 shows signal lines for four TX transistors with respect to time, corresponding to four photodiodes of one pixel and corresponding to integration times L3, L2, L1, and $L_{NIR}$ described above. The TX transistors may operate in a pulsed integration mode to exhibit desired different integration times for HDR imaging. In this figure, the readout for each photodiode starts with the end of a previous TX readout pulse and ends with another TX readout pulse. Within that period, also known as a frame, each TX gate may be associated with an integration time, configurable via clock and timing by the circuits described above.

The voltage across each of the photodiodes and their readout times may be configured by pulses to the corresponding charge transferring transistor TX to set the integration times shown in FIG. 13. For example TX2(L1) in FIG. 14, after the read out pulse (e.g., the first pulse at the line TX2(L1) in FIG. 14), the charge transferring transistor (e.g., TX2 in FIG. 13) can be turned on by a high voltage on control line signal TX2(L1), and RST (referring to FIG. 13) can be turned on again, and charges in the corresponding photodiode (e.g., PD2) are thrown out from the photodiode through the charge transferring transistor TX2 to FD (referring to FIG. 13), and FD is reset to VDDA through reset transistor RST. When the charge transferring transistor (e.g., TX2) is low (turned off), charges are allowed to accumulate on the corresponding photodiode (e.g., PD2) for a period of time, shown in FIG. 14 as the integration time. When the control line signal TX2(L1) is pulsed, for example, the pulse at the end of line TX2(L1), the accumulated charges are transferred to node FD, and are read out via SF and RS transistors as the corresponding photodiode signal. The charge transferring transistors (e.g., TX1, TX2, TX3, and TX4) are controlled individually during one frame between a readout and a previous readout. Here, each photodiode in the pixel corresponding a charge transferring transistor has an integration time configurable by a corresponding charge transferring gate timing as shown in FIG. 14. Each integration time may be set to any length. Thus, according to various integration times, the converted charges are different for each of the four photodiodes, achieving different exposure levels within the same pixel.

As shown above, integration times of four TXs can be controlled independently to achieve HDR imaging with four different integration times. Each of the plurality of photodiodes may be associated with an integration time, and at least two photodiodes of the plurality of photodiodes associated with the same optical filter have different integration times. In some embodiments, the plurality of photodiodes comprise four photodiodes, and at least three of the four photodiodes are each associated with a different integration time. In some embodiments, each of the plurality of photodiodes is coupled to a switch, and the length of the integration time is controlled by the switch. In some embodiments, similar to the modifications described above, it is also possible to achieve three different integration times by setting two photodiodes to have the same integration times, or achieve two different integration times by setting two photodiodes to have the same integration time and setting the other two photodiodes to have another same integration time. Also, the signal charges in the photodiodes can be combined into the FD node (binning) as described above. The binning method can increase the readout efficiency and signal to noise ratio.

Further, based on the disclosure, the NIR filter can be replaced with an IR filter to achieve a RGB-IR HDR sensing system. Alternatively, the NIR filter can be replaced with any other optical filter according to the application. Moreover, any of the optical filters (green, red, and blue) can be replaced with NIR or IR filters.

Some existing HDR imaging systems (known as exposure bracketing) capture multiple images with the image sensor, each image having a different exposure time. This capturing process may take tens of milli-seconds. In this case, performing HDR imaging by combining the captured images may generate undesirable motion artifacts. The disclosed system can capture multi-exposure-level images in one exposure detection. Since one detection takes much less time (e.g., under a few milli-seconds) than multiple detections (e.g., tens of milli-seconds), motion artifacts caused by movements can be minimized. In another word, the disclosed system can integrate the times-domain HDR function with minimized motion artifact and multiple integration times in both RGB and RGB-IR sensing systems and devices.

The specification has described methods, apparatus, and systems for HDR sensing or imaging. As shown above, each pixel may comprise four sub-pixels to achieve 2-4 different integration times within the same pixel. Similarly, each pixel can be divided into n sub-pixels to achieve 1 to n different integration times, with n being any natural number and as long as the fabrication permits. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with the disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A sensing device, comprising
   an array of Bayer pattern units, wherein
   each of the Bayer pattern units comprises a plurality of pixels;
   each of the plurality of pixels comprises a plurality of photodiodes;
   at least one of the plurality of photodiodes in each pixel is configured to detect near infrared (NIR) light;
   at least two of the plurality of photodiodes in each of the plurality of pixels is configured to detect visible light; and
   in each of the plurality of pixels, a single red, green, or blue filter covers the at least two photodiodes configured to detect visible light.

2. The sensing device of claim 1, wherein
   the plurality of pixels in one Bayer pattern unit comprise four pixels in a two by two configuration; and
   the plurality of photodiodes in one pixel comprise four photodiodes in the two by two configuration.

3. The sensing device of claim 1, wherein
   each of the plurality of photodiodes in one pixel is associated with an integration time; and
   at least two photodiodes of the plurality of photodiodes in one pixel have different integration times.

4. The sensing device of claim 3, wherein the integration time corresponds to time for the corresponding photodiode to collect charges caused by impinging photons.

5. A sensing device, comprising
   an array of optical filter combinations, each of the optical filter combinations corresponding to a pixel of the sensing device and having at least two different filters, and each of the optical filter combinations associated with a plurality of photodiodes;
   one of the filters is a single red, green, or blue filter covering a plurality of photodiodes configured to detect visible light; and
   one of the filters is a near infrared (NIR) light filter covering a photodiode configured to detect NIR light.

6. The sensing device of claim 5, wherein
   the plurality of photodiodes comprise four photodiodes;
   the NIR filter covers one of the four photodiodes; and
   the single red, green, or blue filter covers three of the four photodiodes other than the photodiode covered by the NIR filter.

7. The sensing device of claim 5, wherein
   the pixel comprises four sub-pixels in a two by two array;
   the NIR filter corresponds to one of the four sub-pixels; and
   the single red, green, or blue filter corresponds to three of the four sub-pixels other than the sub-pixel corresponding to the NIR filter.

8. The sensing device of claim 7, wherein the single red, green, or blue filter is a materially uniform filter.

9. The sensing device of claim 5, further comprising four micro lenses respectively associated with four photodiodes in the pixel, wherein
   the four photodiodes are disposed in a two by two configuration under the filter combination; and
   the four micro lenses are disposed in the same two by two configuration above the optical filter combination and each configured to direct impinging light to pass through a part of the filter combination to reach the corresponding photodiode.

10. The sensing device of claim 5, wherein
    each of the plurality of photodiodes associated with one optical filter combination is associated with an integration time; and
    at least two photodiodes of the plurality of photodiodes associated with the same optical filter combination have different integration times.

11. The sensing device of claim 10, wherein the integration time corresponds to time for the corresponding photodiode to collect charges caused by impinging photons.

12. The sensing device of claim 10, wherein
    the plurality of photodiodes associated with one optical filter combination comprise four photodiodes; and
    at least three of the four photodiodes are each associated with a different integration time.

13. The sensing device of claim 10, wherein
    each of the plurality of photodiodes is coupled to a switch; and
    the length of the integration time is controlled by the switch.

14. The sensing device of claim 10, wherein
    signals of photodiodes having different integration times are read out separately; and
    signals of photodiodes having the same integration time are combined and read out together.

15. A sensing device, comprising
    a plurality of pixels, each comprising four photodiodes, at least two of the photodiodes in each pixel being configured to detect visible light, and at least one of the photodiodes in each pixel being configured to detect near infrared (NIR) light; and
    in each pixel, a single red, green, or blue filter covers the plurality of photodiodes configured to detect visible light.

16. The sensing device of claim 15, wherein each of the four photodiodes in one pixel is coupled to a transistor for controlling an integration time of the photodiode.

17. The sensing device of claim 15, wherein
    each of the four photodiodes in one pixel is associated with an integration time; and
    at least two photodiodes in one pixel are associated with different integration times.

* * * * *